United States Patent
Xu et al.

(10) Patent No.: US 12,503,434 B2
(45) Date of Patent: Dec. 23, 2025

(54) NITRILOTRIACETIC ACID-CONTAINING LIPIDOID NANOPARTICLES

(71) Applicant: Trustees of Tufts College, Medford, MA (US)

(72) Inventors: Qiaobing Xu, Lexington, MA (US); Yamin Li, Somerville, MA (US)

(73) Assignee: Trustees of Tufts College, Medford, MA (US)

( * ) Notice: Subject to any disclaimer, the term of this patent is extended or adjusted under 35 U.S.C. 154(b) by 982 days.

(21) Appl. No.: 17/631,769

(22) PCT Filed: Jul. 31, 2020

(86) PCT No.: PCT/US2020/044424
§ 371 (c)(1),
(2) Date: Jan. 31, 2022

(87) PCT Pub. No.: WO2021/022121
PCT Pub. Date: Feb. 4, 2021

(65) Prior Publication Data
US 2022/0315529 A1    Oct. 6, 2022

Related U.S. Application Data

(60) Provisional application No. 62/880,921, filed on Jul. 31, 2019.

(51) Int. Cl.
C07C 321/18    (2006.01)
A61K 9/51      (2006.01)
A61K 45/06     (2006.01)
B82Y 5/00      (2011.01)
C07C 229/26    (2006.01)

(52) U.S. Cl.
CPC .......... *C07C 321/18* (2013.01); *A61K 9/5123* (2013.01); *A61K 9/5146* (2013.01); *A61K 45/06* (2013.01); *C07C 229/26* (2013.01); *B82Y 5/00* (2013.01)

(58) Field of Classification Search
None
See application file for complete search history.

(56) References Cited

U.S. PATENT DOCUMENTS

| 2002/0182643 A1 | 12/2002 | Marks et al. |
| 2011/0177156 A1 | 7/2011 | Szoka, Jr. et al. |
| 2018/0117538 A1 | 5/2018 | Bruening et al. |

FOREIGN PATENT DOCUMENTS

WO    WO-2021/022121 A1    2/2021

OTHER PUBLICATIONS

Honjo ("Preparation of affinity membranes using thermally induced phase separation for one-step purification of recombinant proteins" Analytical Biochemistry, 2013, p. 269) (Year: 2013).*
International Search Report and Written Opinion for International Application No. PCT/US2020/044424 dated Dec. 3, 2020.

(Continued)

*Primary Examiner* — Amy C Bonaparte
(74) *Attorney, Agent, or Firm* — Foley Hoag LLP; Dana M. Gordon; Alexander J. Chatterley

(57) ABSTRACT

Disclosed are noncationic lipidoid nanoparticles (LNPs) for His-tagged protein delivery.

20 Claims, 16 Drawing Sheets

(56) References Cited

OTHER PUBLICATIONS

Li et al., "Intracellular Delivery of His-Tagged Genome-Editing Proteins Enabled by Nitrilotriacetic Acid-Containing Lipidoid Nanoparticles," Advanced Healthcare Materials, 8: 20 pages (2019).
PubChem CID 102018549; Create Date: Dec. 24, 2015.

* cited by examiner

NITRILOTRIACETIC ACID-CONTAINING LIPIDOID NANOPARTICLES

RELATED APPLICATION

This application is a U.S. national stage filing under 35 U.S.C. § 371 of PCT Application No. PCT/US20/44424, filed Jul. 31, 2020; which claims the benefit of priority to U.S. Provisional Application 62/880,921 filed on Jul. 31, 2019.

GOVERNMENT SUPPORT

This invention was made with government support under grants UG3 TR002636-01 and 1R21EB024041-01 awarded by the National Institutes of Health, and grant DMR1452122 awarded by the National Science Foundation. The government has certain rights in the invention.

BACKGROUND

Proteins are vital molecules in cells and life, playing important roles in maintaining structures and functions. Deficiency or malfunction of proteins could induce serious conditions. Oftentimes, the most straightforward strategy to deal with these conditions or diseases is delivering functional proteins to specific sites. Most of the current protein-based therapeutics, including enzymes, monoclonal antibodies, act upon secreted and surface-bound targets. Intracellular delivery methods that can facilitate the cell internalization of intact peptides and proteins could further exploit the potentials of protein therapeutics and expand protein-based therapeutic modalities. Both mechanical/physical and biochemical-based techniques have been developed for intracellular delivery of proteins. Microinjection, electroporation and acoustic-assisted transfection are straightforward and usually efficient for protein delivery. However, their invasive features complicated the in vivo applications. Biochemical methods like supramolecular encapsulation and covalent conjugation have also been previously demonstrated to be feasible for intracellular delivery of therapeutic proteins. In addition, lipid, polymer, metal and metal oxide nanoparticles etc., have been reported for protein delivery purposes. Several combinatorial libraries of lipid-like molecules (lipidoid)-based nanoparticles (LNPs) for intracellular delivery applications has also been developed. The effectiveness of the LNPs have been shown by us and others in both in vitro and in vivo studies. These cationic lipidoids contain amine head groups and the main driving-force for cargo complexation was the electrostatic interaction between LNP carriers and anionic guest molecules (e.g., negatively charged proteins, mRNA, siRNA and pDNA). It will be useful to explore the possibility of using non-cationic lipidoids and other types of supramolecular interactions for protein loading and delivery.

SUMMARY

One of the most widely-used protein purification processes takes advantage of the coordination interaction between the nickel-immobilized beads with the imidazole groups on the His-tagged proteins. Dowdy (*J Am Chem Soc* 2010, 132, 10680) and Zuber (*Angew Chem Int Edit* 2015, 54, 10583) developed nitrilotriacetic acid (NTA) moiety-containing PTDs (peptide transduction domains) peptide and synthetic polymers complexed with divalent nickel ions for His-tagged protein/nanoparticle cargoes binding and intracellular delivery. Inspired by their designs, we report here the synthesis of three types of NTA-containing lipidoids with different hydrophobic tail structures (NTA-EC16, NTA-O16B and NTA-O17O; FIG. 1) for protein delivery. As a proof-of-concept, nanoparticles were fabricated using active lipidoids containing NTA groups, together with divalent nickel ions and helper lipids (cholesterol, phospholipid, and macromolecular lipids; FIG. 1B) for optimized intracellular delivery efficiencies. His-tagged protein including green fluorescent protein, Cre recombinase variant and recently developed CRISPR (clustered regularly interspaced short palindromic repeat)-associated protein 9 (Cas9) nuclease were complexed with the nanoparticle formulations and their internalization efficiencies as well as genome editing activities of Cre recombinase and Cas9 protein were studied (FIG. 1A).

In one aspect, provided are compounds of formula (I):

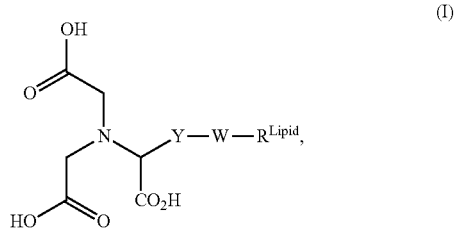

or a pharmaceutically acceptable salt thereof, wherein
Y is a divalent linker;
W is $-NR^{20}-$, $-O-$, or $-S-$;
$R^{Lipid}$ is independently substituted or unsubstituted $C_{1-20}$ alkyl, substituted or unsubstituted $C_{1-20}$ alkenyl, substituted or unsubstituted $C_{1-20}$ alknyl, substituted or unsubstituted $C_{1-20}$ heteroalkyl, substituted or unsubstituted $C_{1-20}$ heteroalkenyl, or substituted or unsubstituted $C_{1-20}$ heteroalknyl; and
$R^{20}$ is $R^{Lipid}$, H, $C_{1-6}$ alkyl, $C_{1-6}$ alkenyl, or $C_{1-6}$ alkynyl.

In certain embodiments, $R^{Lipid}$ is of the structure:

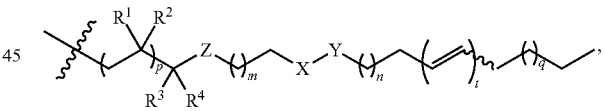

wherein
$R^1$ and $R^2$ are independently $-H$, $-OH$, $-NHR^{30}$, or $-SH$;
$R^3$ and $R^4$ are both $-H$; or $R^3$ and $R^4$ are taken together to form an oxo ($=O$) group;
Z is $-CH_2-$, $-O-$, $-NR^{30}-$, or $-S-$;
X and Y are independently $-CH_2-$, $-NR^{30}-$, $-O-$, $-S-$, or $-Se-$;
m is an integer selected from 1-3;
n is an integer selected from 1-14;
p is 0 or 1;
q is an integer selected from 1-10;
t is 0 or 1; and
$R^{30}$ is $-H$, $C_{1-6}$ alkyl, $C_{1-6}$ alkenyl, or $C_{1-6}$ alkynyl.

DETAILED DESCRIPTION

Figure 1A:
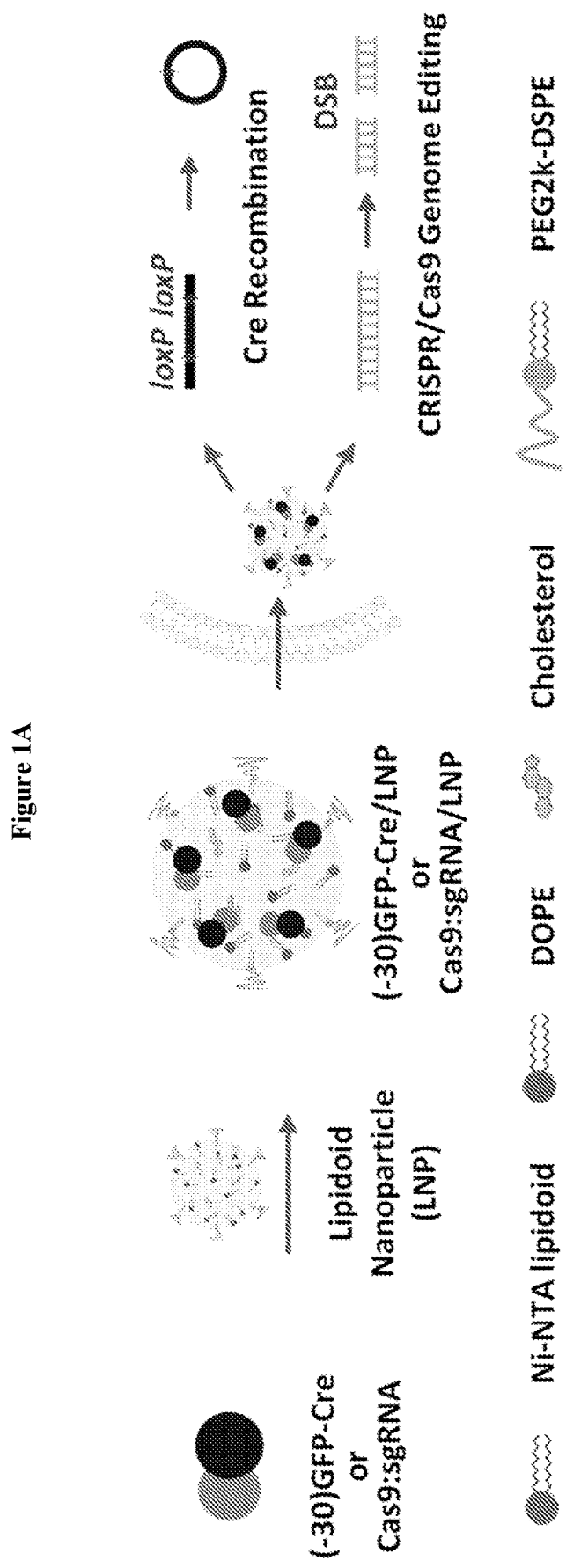
FIG. 1A depicts schematics of cargo protein loading and delivery by NTA-lipidoids nanoparticle formulations.

In one aspect, provided are compounds of formula (I):

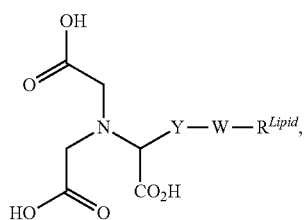

or a pharmaceutically acceptable salt thereof, wherein
Y is a divalent linker;
W is —$NR^{20}$—, —O—, or —S—;
$R^{Lipid}$ is independently substituted or unsubstituted $C_{1-20}$ alkyl, substituted or unsubstituted $C_{1-20}$ alkenyl, substituted or unsubstituted $C_{1-20}$ alkynyl, substituted or unsubstituted $C_{1-20}$ heteroalkyl, substituted or unsubstituted $C_{1-20}$ heteroalkenyl, or substituted or unsubstituted $C_{1-20}$ heteroalkynyl; and
$R^{20}$ is $R^{Lipid}$, H, $C_{1-6}$ alkyl, $C_{1-6}$ alkenyl, or $C_{1-6}$ alkynyl.

In certain embodiments, $R^{Lipid}$ is of the structure:

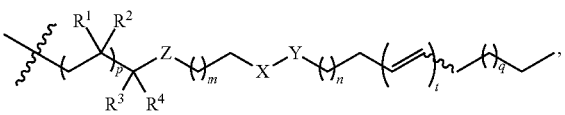

wherein
$R^1$ and $R^2$ are independently —H, —OH, —$NHR^{30}$, or —SH;
$R^3$ and $R^4$ are both —H; or $R^3$ and $R^4$ are taken together to form an oxo (═O) group;
Z is —$CH_2$—, —O—, —$NR^{30}$—, or —S—;
X and Y are independently —$CH_2$—, —$NR^{30}$—, —O—, —S—, or —Se—;
m is an integer selected from 1-3;
n is an integer selected from 1-14;
p is 0 or 1;
q is an integer selected from 1-10;
t is 0 or 1; and
$R^{30}$ is —H, $C_{1-6}$ alkyl, $C_{1-6}$ alkenyl, or $C_{1-6}$ alkynyl.

In certain embodiments, $R^1$ and $R^2$ are independently —H or —OH. In certain embodiments, $R^1$ and $R^2$ are —H. In certain embodiments, $R^1$ is —H; and $R^2$ is —OH.

In certain embodiments, $R^3$ and $R^4$ are —H. In certain embodiments, $R^3$ and $R^4$ are taken together to form an oxo (═O) group.

In certain embodiments, Y is substituted or unsubstituted $C_{1-6}$ alkylene, substituted or unsubstituted $C_{1-6}$ alkenylene, or substituted or unsubstituted $C_{1-6}$ alknylene, substituted or unsubstituted $C_{1-6}$ heteroalkylene, substituted or unsubstituted $C_{1-6}$ heteroalkenylene, or substituted or unsubstituted $C_{1-6}$ heteroalknylene. In certain embodiments, Y is substituted or unsubstituted $C_{1-6}$ alkylene. In certain embodiments, Y is

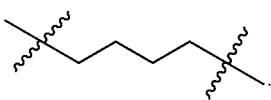 [SMILES: *CCCC*]

In certain embodiments, W is —NR$^{20}$— or —S—. In certain embodiments, W is —NR$^{20}$—.

In certain embodiments, W is —S—.

In certain embodiments, Z is —CH$_2$—, —O—, or —NR$^{30}$—. In certain embodiments, Z is —CH$_2$—. In certain embodiments, Z is —O—. In certain embodiments, Z is —NR$^{30}$—.

In certain embodiments, X and Y are independently —CH$_2$— or —O—. In certain embodiments, X and Y are independently —CH$_2$— or —O—, wherein X and Y are not the same.

In certain embodiments, X and Y are independently —CH$_2$— or —S—. In certain embodiments, X and Y are both —CH$_2$—. In certain embodiments, X and Y are both —S—.

In certain embodiments, m is 1 or 2. In certain embodiments, m is 2 or 3. In certain embodiments, m is 1. In certain embodiments, m is 2. In certain embodiments, m is 3.

In certain embodiments, n is an integer selected from 1-7. In certain embodiments, n is an integer selected from 8-14. In certain embodiments, n is an integer selected from 1-5. In certain embodiments, n is an integer selected from 6-10. In certain embodiments, n is an integer selected from 11-14. In certain embodiments, n is an integer selected from 1-3. In certain embodiments, n is an integer selected from 4-6. In certain embodiments, n is an integer selected from 7-9. In certain embodiments, n is an integer selected from 10-12. In certain embodiments, n is an integer selected from 13-14. In certain embodiments, n is an integer selected from 4-12. In certain embodiments, n is an integer selected from 6-10.

In certain embodiments, p is 0. In certain embodiments, p is 1.

In certain embodiments, q is an integer selected from 1-5. In certain embodiments, q is an integer selected from 6-10. In certain embodiments, q is an integer selected from 2-6. In certain embodiments, q is an integer selected from 4-8. In certain embodiments, q is an integer selected from 1-4. In certain embodiments, q is an integer selected from 5-8. In certain embodiments, q is an integer selected from 3-7. In certain embodiments, q is an integer selected from 5-9. In certain embodiments, q is an integer selected from 2-8. In certain embodiments, q is an integer selected from 4-8.

In certain embodiments, t is 0. In certain embodiments, t is 1.

In certain embodiments, each instance of R$^{Lipid}$ is independently selected from the group consisting of

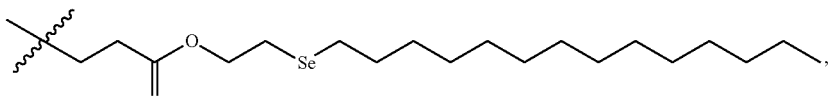

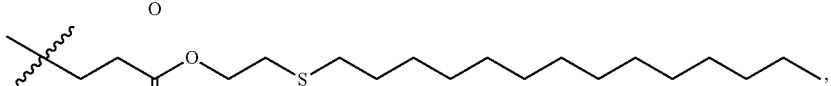

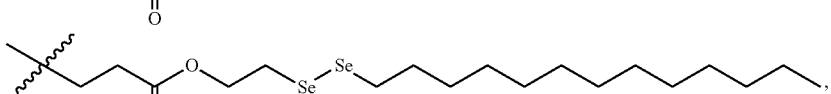

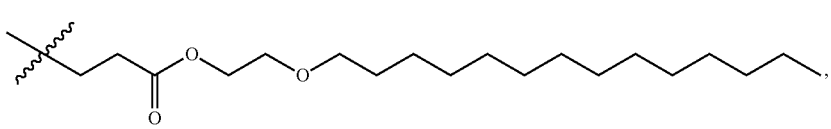

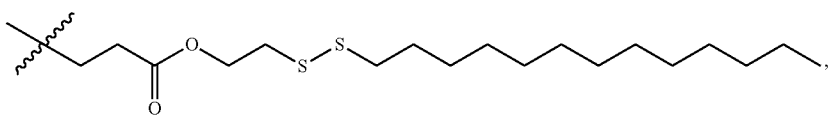

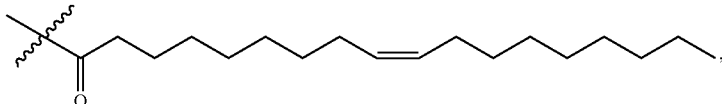

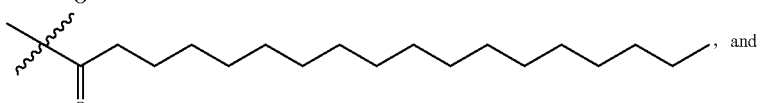, and

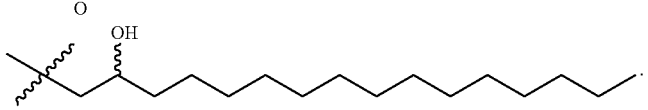.

In certain embodiments, each instance of $R^{Lipid}$ is independently selected from the group of

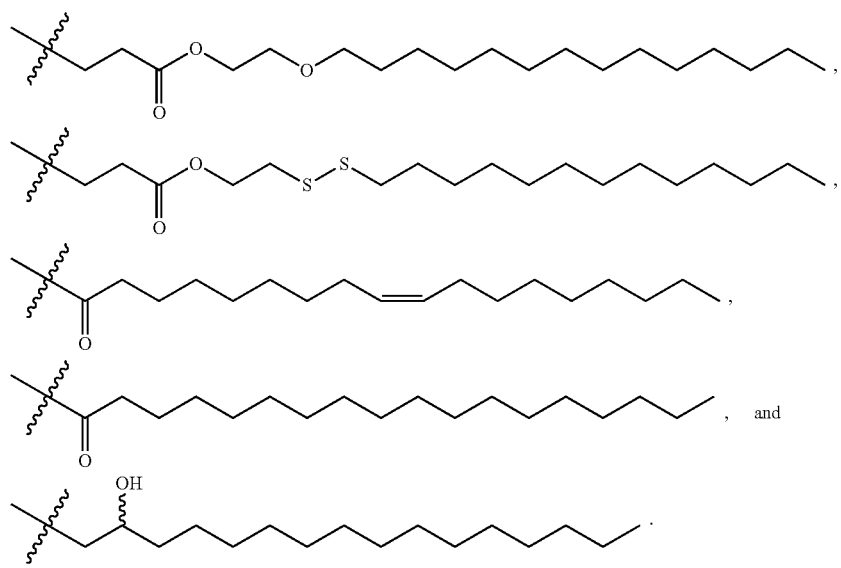

In one aspect, provided are compounds selected from the group consisting of:

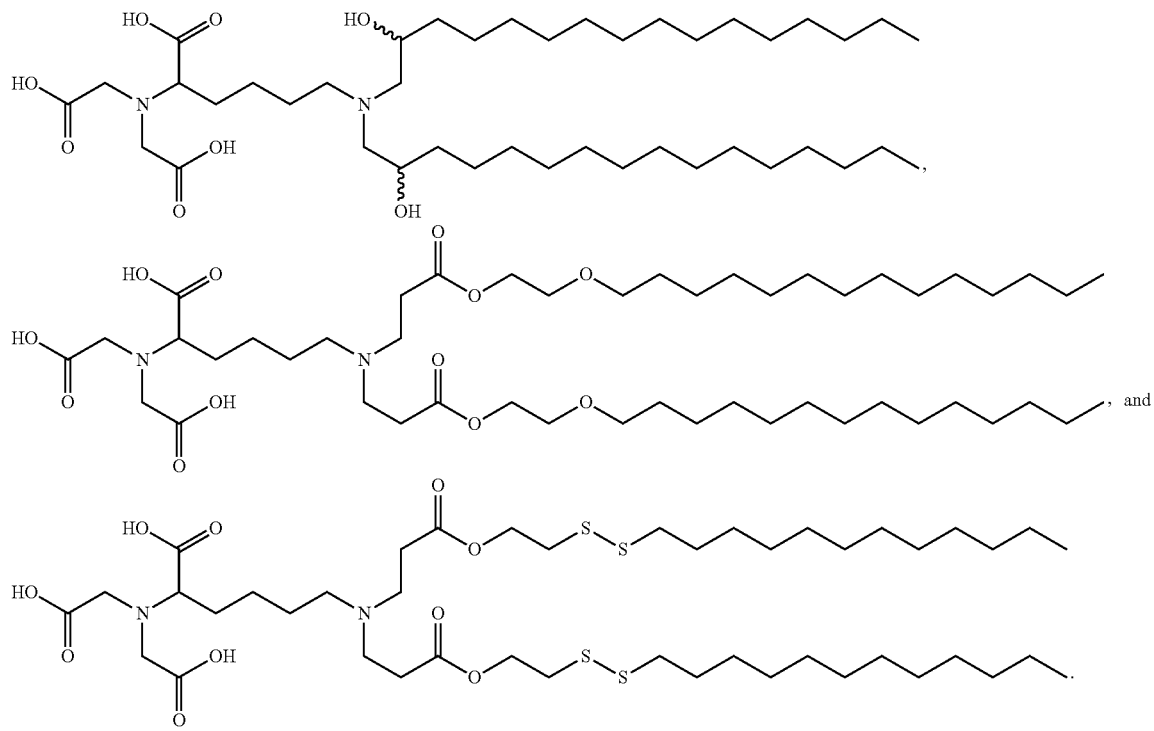

In one aspect, provided are lipidoid nanoparticles, comprising a plurality of compounds disclosed herein.

In certain embodiments, the lipidoid nanoparticle further comprises cholesterol.

In certain embodiments, the lipidoid nanoparticles further comprises DOPE or PEG2K-DEPC.

In certain embodiments, the lipidoid nanoparticles further comprises a divalent nickel, wherein the compound chelates with the divalent nickel.

In certain embodiments, the lipidoid nanoparticles further comprises a protein or a nucleic acid.

In certain embodiments, the protein or the nucleic acid is GFP-Cre or CRISPR/Cas9.

In certain embodiments, the protein or the nucleic acid is GFP-Cre. In certain embodiments, the protein or the nucleic acid is CRISPR/Cas9.

In certain embodiments, the divalent nickel binds to the protein or the nucleic acid via a non-covalent interaction.

In certain embodiments, the lipidoid nanoparticles further comprises a small molecule.

In certain embodiments, the small molecule is an antifungal agent or a chemotherapeutic agent.

In certain embodiments, the small molecule is selected from the group consisting of Bortezomib, Imatinib, Gefitinib, Erlotinib, Afatinib, Osimertinib, Dacomitinib, Daunorubicin hydrochloride, cytarabine, Fluorouracil, Irinotecan Hydrochloride, Vincristine Sulfate, Methotrexate, Paclitaxel, Vincristine Sulfate, epirubicin, docetaxel, Cyclophosphamide, Carboplatin, Lenalidomide, Ibrutinib, Abiraterone acetate, Enzalutamide, Pemetrexed, Palbociclib, Nilotinib, Everolimus, Ruxolitinib, epirubicin, pirirubicin, idarubicin, valrubicin, amrubicin, Bleomycin, phleomycin, dactinomycin, Mithramycin, streptozotecin, pentostatin, Mitosanes mitomycin C, Enediynes calicheamycin, Glycosides rebeccamycin, Macrolide lactones epotihilones, ixabepilone, pentostatin, Salinosporamide A, Vinblastine, Vincristine, Etoposide, Teniposide, Vinorelbine, Docetaxel, Camptothecin, Hycamtin, Pederin, Theopederins, Annamides, Trabectedin, Aplidine, and Ecteinascidin 743 (ET743).

In certain embodiments, the small molecule is Amphotericin B or Doxorubicin.

In certain embodiments, the lipidoid nanoparticles have a particle size of about 25 nm to about 1000 nm. In certain embodiments, the lipidoid nanoparticles have a particle size of about 50 nm to about 750 nm.

In one aspect, provided are pharmaceutical compositions, comprising a plurality of lipidoid nanoparticles disclosed herein, and a pharmaceutically acceptable carrier or excipient.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well-known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—$CH_2$—O-alkyl, —OP(O)(O-alkyl)$_2$ or —$CH_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

Articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

As used herein, the term "alkyl" refers to saturated aliphatic groups, including but not limited to $C_1$-$C_{10}$ straight-chain alkyl groups or $C_1$-$C_{10}$ branched-chain alkyl groups. Preferably, the "alkyl" group refers to $C_1$-$C_6$ straight-chain alkyl groups or $C_1$-$C_6$ branched-chain alkyl groups. Most preferably, the "alkyl" group refers to $C_1$-$C_4$ straight-chain alkyl groups or $C_1$-$C_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto.

Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., $C_{1-30}$ for straight chains, $C_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. $C_0$alkyl indicates a hydrogen where the group is in a terminal position, a bond if internal. A $C_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amide", as used herein, refers to a group

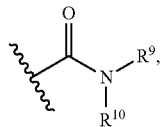

wherein $R^9$ and $R^{10}$ each independently represent a hydrogen or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

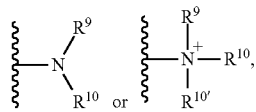

wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

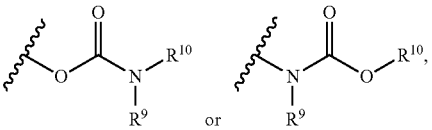

wherein $R^9$ and $R^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group —$OCO_2$—.

The term "carboxy", as used herein, refers to a group represented by the formula —$CO_2H$.

The term "ester", as used herein, refers to a group —C(O)O$R^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical.

Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —OSO$_3$H, or a pharmaceutically acceptable salt thereof.

The term "sulfonamide" is art-recognized and refers to the group represented by the general formulae

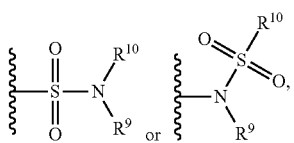

wherein $R^9$ and $R^{10}$ independently represents hydrogen or hydrocarbyl.

The term "sulfoxide" is art-recognized and refers to the group -S(O)—.

The term "sulfonate" is art-recognized and refers to the group SO$_3$H, or a pharmaceutically acceptable salt thereof.

The term "sulfone" is art-recognized and refers to the group —S(O)$_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds.

In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR$^9$ or —SC(O)R$^9$ wherein R$^9$ represents a hydrocarbyl.

The term "thioether", as used herein, is equivalent to an ether, wherein the oxygen is replaced with a sulfur.

The term "urea" is art-recognized and may be represented by the general formula

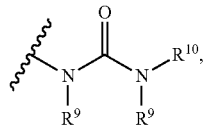

wherein R$^9$ and R$^{10}$ independently represent hydrogen or a hydrocarbyl.

The term "modulate" as used herein includes the inhibition or suppression of a function or activity (such as cell proliferation) as well as the enhancement of a function or activity.

The phrase "pharmaceutically acceptable" is art-recognized. In certain embodiments, the term includes compositions, excipients, adjuvants, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

"Salt" is used herein to refer to an acid addition salt or a basic addition salt.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds which contain alkenyl groups may exist as Z (zusammen) or E (entgegen) isomers. In each instance, the disclosure includes both mixture and separate individual isomers.

Some of the compounds may also exist in tautomeric forms. Such forms, although not explicitly indicated in the formulae described herein, are intended to be included within the scope of the present disclosure.

"Pharmaceutically acceptable" means approved or approvable by a regulatory agency of the Federal or a state government or the corresponding agency in countries other than the United States, or that is listed in the U.S. Pharmacopoeia or other generally recognized pharmacopoeia for use in animals, and more particularly, in humans.

"Pharmaceutically acceptable salt" refers to a salt of a compound of the invention that is pharmaceutically acceptable and that possesses the desired pharmacological activity of the parent compound. In particular, such salts are non-toxic may be inorganic or organic acid addition salts and base addition salts. Specifically, such salts include: (1) acid addition salts, formed with inorganic acids such as hydrochloric acid, hydrobromic acid, sulfuric acid, nitric acid, phosphoric acid, and the like; or formed with organic acids such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethanedisulfonic acid, 2-hydroxyethanesulfonic acid, benzenesulfonic acid, chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, and the like; or (2) salts formed when an acidic proton present in the parent compound either is replaced by a metal ion, e.g., an alkali metal ion, an alkaline earth ion, or an aluminum ion; or coordinates with an organic base such as ethanolamine, diethanolamine, triethanolamine, N-methylglucamine and the like. Salts further include, by way of example only, sodium potassium, calcium, magnesium, ammonium, tetraalkylammonium, and the like; and when the compound contains a basic functionality, salts of nontoxic organic or inorganic acids, such as hydrochloride, hydrobromide, tartrate, mesylate, acetate, maleate, oxalate and the like.

The term "pharmaceutically acceptable cation" refers to an acceptable cationic counterion of an acidic functional group. Such cations are exemplified by sodium, potassium, calcium, magnesium, ammonium, tetraalkylammonium cations, and the like (see, e.g., Berge, et al., J. Pharm. Sci. 66 (1):1-79 (January 77).

"Pharmaceutically acceptable vehicle" refers to a diluent, adjuvant, excipient or carrier with which a compound of the invention is administered.

"Pharmaceutically acceptable metabolically cleavable group" refers to a group which is cleaved in vivo to yield the parent molecule of the structural formula indicated herein. Examples of metabolically cleavable groups include —COR, —COOR, —CONRR and —CH$_2$OR radicals, where R is selected independently at each occurrence from alkyl, trialkylsilyl, carbocyclic aryl or carbocyclic aryl substituted with one or more of alkyl, halogen, hydroxy or alkoxy. Specific examples of representative metabolically cleavable groups include acetyl, methoxycarbonyl, benzoyl, methoxymethyl and trimethylsilyl groups.

"Prodrugs" refers to compounds, including derivatives of the compounds of the invention, which have cleavable groups and become by solvolysis or under physiological conditions the compounds of the invention which are pharmaceutically active in vivo. Such examples include, but are not limited to, choline ester derivatives and the like, N-alkylmorpholine esters and the like. Other derivatives of the compounds of this invention have activity in both their acid and acid derivative forms, but in the acid sensitive form often offers advantages of solubility, tissue compatibility, or delayed release in the mammalian organism (see, Bundgard, H., Design of Prodrugs, pp. 7-9, 21-24, Elsevier, Amsterdam 1985). Prodrugs include acid derivatives well known to practitioners of the art, such as, for example, esters prepared by reaction of the parent acid with a suitable alcohol, or amides prepared by reaction of the parent acid compound with a substituted or unsubstituted amine, or acid anhydrides, or mixed anhydrides. Simple aliphatic or aromatic esters, amides and anhydrides derived from acidic groups pendant on the compounds of this invention are particular prodrugs. In some cases it is desirable to prepare double ester type prodrugs such as (acyloxy)alkylesters or (alkoxycarbonyl)oxy)alkylesters. Particularly the C1-C$_8$ alkyl, $C2-C_8$ alkenyl, $C2-C_8$ alkynyl, aryl, $C_7-C_{12}$ substituted aryl, and $C_7-C_{12}$ arylalkyl esters of the compounds of the invention.

"Solvate" refers to forms of the compound that are associated with a solvent or water (also referred to as "hydrate"), usually by a solvolysis reaction. This physical association includes hydrogen bonding. Conventional solvents include water, ethanol, acetic acid and the like. The compounds of the invention may be prepared e.g., in crystalline form and may be solvated or hydrated. Suitable solvates include pharmaceutically acceptable solvates, such as hydrates, and further include both stoichiometric solvates and non-stoichiometric solvates. In certain instances, the solvate will be capable of isolation, for example when one or more solvent molecules are incorporated in the crystal lattice of the crystalline solid. "Solvate" encompasses both solution-phase and isolable solvates. Representative solvates include hydrates, ethanolates and methanolates.

A "subject" to which administration is contemplated includes, but is not limited to, humans (i.e., a male or female of any age group, e.g., a pediatric subject (e.g, infant, child, adolescent) or adult subject (e.g., young adult, middle aged adult or senior adult) and/or a non-human animal, e.g., a mammal such as primates (e.g., cynomolgus monkeys, rhesus monkeys), cattle, pigs, horses, sheep, goats, rodents, cats, and/or dogs. In certain embodiments, the subject is a human. In certain embodiments, the subject is a non-human animal. The terms "human," "patient," and "subject" are used interchangeably herein.

An "effective amount" means the amount of a compound that, when administered to a subject for treating or preventing a disease, is sufficient to effect such treatment or prevention. The "effective amount" can vary depending on the compound, the disease and its severity, and the age, weight, etc., of the subject to be treated. A "therapeutically effective amount" refers to the effective amount for therapeutic treatment. A "prophylatically effective amount" refers to the effective amount for prophylactic treatment.

"Preventing" or "prevention" or "prophylactic treatment" refers to a reduction in risk of acquiring or developing a disease or disorder (i.e., causing at least one of the clinical symptoms of the disease not to develop in a subject not yet exposed to a disease-causing agent, or predisposed to the disease in advance of disease onset.

The term "prophylaxis" is related to "prevention," and refers to a measure or procedure the purpose of which is to prevent, rather than to treat or cure a disease. Non limiting examples of prophylactic measures may include the administration of vaccines; the administration of low molecular weight heparin to hospital patients at risk for thrombosis due, for example, to immobilization, and the administration of an anti-malarial agent such as chloroquine, in advance of a visit to a geographical region where malaria is endemic or the risk of contracting malaria is high.

"Treating" or "treatment" or "therapeutic treatment" of any disease or disorder refers, in one embodiment, to ameliorating the disease or disorder (i.e., arresting the disease or reducing the manifestation, extent or severity of at least one of the clinical symptoms thereof). In another embodiment "treating" or "treatment" refers to ameliorating at least one physical parameter, which may not be discernible by the subject. In yet another embodiment, "treating" or "treatment" refers to modulating the disease or disorder, either physically, (e.g., stabilization of a discernible symptom), physiologically, (e.g., stabilization of a physical parameter), or both. In a further embodiment, "treating" or "treatment" relates to slowing the progression of the disease.

As used herein, the term "isotopic variant" refers to a compound that contains unnatural proportions of isotopes at one or more of the atoms that constitute such compound. For example, an "isotopic variant" of a compound can contain one or more non-radioactive isotopes, such as for example, deuterium ($^2$H or D), carbon-13 ($^{13}$C), nitrogen-15 ($^{15}$N), or the like. It will be understood that, in a compound where such isotopic substitution is made, the following atoms, where present, may vary, so that for example, any hydrogen may be that37 $^2$H/D, any carbon may be $^{13}$C, or any nitrogen may be $^{15}$N, and that the presence and placement of such atoms may be determined within the skill of the art. Likewise, the invention may include the preparation of isotopic variants with radioisotopes, in the instance for example, where the resulting compounds may be used for drug and/or substrate tissue distribution studies. The radio-active isotopes tritium, i.e., $^3$H, and carbon-14, i.e., $^{14}$C, are particularly useful for this purpose in view of their ease of incorporation and ready means of detection. Further, compounds may be prepared that are substituted with positron emitting isotopes, such as $^{11}$C, $^{18}$F, $^{15}$O and $^{13}$N, and would be useful in Positron Emission Topography (PET) studies for examining substrate receptor occupancy. All isotopic variants of the compounds provided herein, radioactive or not, are intended to be encompassed within the scope of the invention.

It is also to be understood that compounds that have the same molecular formula but differ in the nature or sequence of bonding of their atoms or the arrangement of their atoms in space are termed "isomers." Isomers that differ in the arrangement of their atoms in space are termed "stereoisomers."

Stereoisomers that are not mirror images of one another are termed "diastereomers" and those that are non-superimposable mirror images of each other are termed "enantiomers." When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+)- or (−)-isomers respectively). A chiral compound can exist as either individual enantiomer or as a mixture thereof. A mixture containing equal proportions of the enantiomers is called a "racemic mixture".

"Tautomers" refer to compounds that are interchangeable forms of a particular compound structure, and that vary in the displacement of hydrogen atoms and electrons.

Thus, two structures may be in equilibrium through the movement of it electrons and an atom (usually H). For example, enols and ketones are tautomers because they are rapidly interconverted by treatment with either acid or base. Another example of tautomerism is the aci- and nitro-forms of phenylnitromethane, that are likewise formed by treatment with acid or base. Tautomeric forms may be relevant to the attainment of the optimal chemical reactivity and biological activity of a compound of interest.

As used herein a pure enantiomeric compound is substantially free from other enantiomers or stereoisomers of the compound (i.e., in enantiomeric excess). In other words, an "S" form of the compound is substantially free from the "R" form of the compound and is, thus, in enantiomeric excess of the "R" form. The term "enantiomerically pure" or "pure enantiomer" denotes that the compound comprises more than 95% by weight, more than 96% by weight, more than 97% by weight, more than 98% by weight, more than 98.5% by weight, more than 99% by weight, more than 99.2% by weight, more than 99.5% by weight, more than 99.6% by weight, more than 99.7% by weight, more than 99.8% by weight or more than 99.9% by weight, of the enantiomer. In certain embodiments, the weights are based upon total weight of all enantiomers or stereoisomers of the compound.

As used herein and unless otherwise indicated, the term "enantiomerically pure R-compound" refers to at least about 95% by weight R-compound and at most about 5% by weight S-compound, at least about 99% by weight R-compound and at most about 1% by weight S-compound, or at least about 99.9% by weight R-compound and at most about 0.1% by weight S-compound. In certain embodiments, the weights are based upon total weight of compound.

As used herein and unless otherwise indicated, the term "enantiomerically pure S-compound" or "S-compound" refers to at least about 95% by weight S-compound and at most about 5% by weight R-compound, at least about 99% by weight S-compound and at most about 1% by weight R-compound or at least about 99.9% by weight S-compound and at most about 0.1% by weight R-compound. In certain embodiments, the weights are based upon total weight of compound.

In the compositions provided herein, an enantiomerically pure compound or a pharmaceutically acceptable salt, solvate, hydrate or prodrug thereof can be present with other active or inactive ingredients. For example, a pharmaceutical composition comprising enantiomerically pure R-compound can comprise, for example, about 90% excipient and about 10% enantiomerically pure R-compound. In certain embodiments, the enantiomerically pure R-compound in such compositions can, for example, comprise, at least about 95% by weight R-compound and at most about 5% by weight S-compound, by total weight of the compound. For example, a pharmaceutical composition comprising enantiomerically pure S-compound can comprise, for example, about 90% excipient and about 10% enantiomerically pure S-compound. In certain embodiments, the enantiomerically pure S-compound in such compositions can, for example, comprise, at least about 95% by weight S-compound and at most about 5% by weight R-compound, by total weight of the compound. In certain embodiments, the active ingredient can be formulated with little or no excipient or carrier.

The compounds of this invention may possess one or more asymmetric centers; such compounds can therefore be produced as individual (R)- or (S)-stereoisomers or as mixtures thereof.

Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art.

One having ordinary skill in the art of organic synthesis will recognize that the maximum number of heteroatoms in a stable, chemically feasible heterocyclic ring, whether it is aromatic or non-aromatic, is determined by the size of the ring, the degree of unsaturation and the valence of the heteroatoms. In general, a heterocyclic ring may have one to four heteroatoms so long as the heteroaromatic ring is chemically feasible and stable.

EXAMPLES

In order that the invention described herein may be more fully understood, the following examples are set forth. The examples described in this application are offered to illustrate the compounds, compositions, materials, device, and methods provided herein and are not to be construed in any way as limiting their scope.

Materials and Methods

General: Nα,Nα-Bis(carboxymethyl)-L-lysine and EC16 were purchased from Sigma-Aldrich. O16B and O17O were synthesized following previously reported procedures (*Biomaterials* 2018, 178, 652; *Biomaterials science* 2018, 10.1039/C8BM00637G; *Adv Healthc Mater* 2014, 3, 1398). All other chemicals used for lipidoids synthesis were purchased from Sigma-Aldrich and used without further purification unless otherwise noted. His-tagged proteins including green fluorescent protein (GFP), negatively supercharged Cre recombinase ((−30)GFP-Cre), and *S. pyogenes* CRISPR-associated protein 9 nuclease (Cas9) were produced according to previously reported protocols (*Natl Acad Sci USA* 2016, 113, 2868). ATTO 550 labeled tracrRNA and crRNA were purchased from Integrated DNA Technologies (IDT), and single-guide RNA targeting GFP gene was synthesized as previously reported (*Natl Acad Sci USA* 2016, 113, 2868). Cas9 and guide RNAs were mixed in PBS at 1/1 molar ratio and incubated for 30 min before use. Hydrodynamic size and polydispersity index of the nanoparticles were measured by a Zeta-PALS particle size analyzer (Brookhaven Instruments). HeLa, HEK, DsRed-HeLa and GFP-HEK cells were cultured in Dulbecco's modified eagle's medium (DMEM, Sigma-Aldrich) with 10% fetal bovine serum (FBS, Sigma-Aldrich) and 1% penicillin-streptomycin (Gibco). Fluorescence profiles of the cells were analyzed using a flow cytometer (BD FACS Calibur, BD Science, CA) and FlowJo software. Nanoparticles were imaged by scanning electronic microscopy (SEM), Ultra 55 field-emission SEM, Carl Zeiss AG, at an acceleration voltage of 5 kV. All SEM samples were dried under room temperature and coated with 5-10 nm thick Pt/Pd (80:20).

Synthesis of Lipidoids Synthesis: The hydrophobic tails (EC16,O016B and O17O) were reacted with head group (Nα,Nα-Bis(carboxymethyl)-L-lysine) at a 2.5/1 molar ratio in Teflon-lined glass screw-top vials in the presence of isopropanol and triethylamine for 72 h at 70° C. The crude products were purified by a Teledyne Isco Chromotography system and characterized by ESI-MS.

Preparation of Nanoparticles: NTA-lipidoid was dissolved in pure ethanol and combined in a clean glass vial with precalculated amount of cholesterol (Sigma-Aldrich), DOPE (1,2-dioleoyl-sn-glycero-3-phosphoethanolamine, Avanti Polar Lipids) and PEG2k-DSPE (1,2-distearoyl-sn-glycero-3-phosphoethanolamine-N-[methoxy(polyethylene glycol)-2000], Avanti Polar Lipids) at different molar ratios. PBS buffer (pH=7.2) was then added into the ethanol solution dropwise with continuous stirring. The mixture solution was transferred in to a dialysis cassette (MWCO 3.5 kDa, Slide-A-Lyzer, ThermoFisher Scientific) and dialyzed against pure water to remove the ethanol. After the dialysis, precalculated amount of nickel chloride in distilled water was added (nickel/NTA lipidoid=1/1, molar ratio). After brief sonication, the solution was left undisturbed at room temperature for 2 h. The His-tagged protein solution was then mixed with lipidoid nanoparticles and incubated for another 2 h before use.

Protein Loading Content and Efficiency: After incubating cargo proteins (GFP and (−30)GFP-Cre) with lipidoid nanoparticles with different feeding ratios, the solutions were centrifuged under 13400 rpm for 20 min at room temperature. The supernatant was carefully transferred into another vial. Standard curves were generated by using serial dilutions of protein solutions and the protein concentrations in the supernatant were determined through measuring the fluorescent intensity. The protein loading content was calculated as $W_{protein\ loaded\ in\ nanoparticle}/(W_{protein\ loaded\ in\ nanoparticle}+W_{nanoparticle})*100\%$ and the protein loading efficiency was calculated as $W_{protein\ loaded\ in\ nanoparticle}/W_{total\ feeding\ protein}*100\%$. The weight of protein loaded in nanoparticle ($W_{protein\ loaded\ in\ nanoparticle}$)=weight of total feeding protein ($W_{total\ feeding\ protein}$)−weight of protein in the supernatant; weight of nanoparticle ($W_{nanoparticle}$)=weight NTA-lipidoid+weight of helper lipids.

Intracellular Delivery of His-tagged Proteins: Typically, a 48-well cell culture plate was seeded with HeLa or HEK cells at an initial concentration of 20000 cells per well dispersed in 250 uL of DMEM media and incubated for 24 h before transfection. Protein loaded nanoparticles solution in 30 uL volume was then added to the plate and the plate was incubated for another 8 h, 24 h or 48 h before flow cytometry analysis.

Evaluation of Cytotoxicity: The cytotoxicity of protein loaded nanoparticles against cells were measured via the standard MTT (3-(4,5-dimethylthiazol-2-yl)-2,5-diphenyltetrazolium bromide) assay. Typically, a 96-well plate was seeded with HeLa or HEK cells at an initial concentration of 8000 cells per well dispersed in 100 μL of DMEM media and incubated for 24 h. Protein loaded nanoparticles solution was added into the cell culture media and the plate was incubated for another 8 h, 24 h or 48 h. MTT solution (5 mg mL$^{-1}$ in PBS) was then added into each well and the cells were incubated for another 4 h at 37° C. The cell culture media was then removed carefully, and 200 μL of dimethyl sulfoxide (DMSO) was added to each well. The plate was gently agitated by an orbital shaker for 10 min at room temperature and absorbance measurements were immediately read at a wavelength of 570 nm by a microplate reader (Molecular Devices, SpectraMax M2) while cell viability was calculated accordingly.

Statistical Analysis: Data were reported as mean±SD. Experiments were repeated at least three times. Student's t-tests were performed to determine the significance of differences between groups. P values less than 0.05 were considered to be statistically significant.

Example 1. Lipidoids Synthesis and Nanoparticles Fabrication

Figure 5:
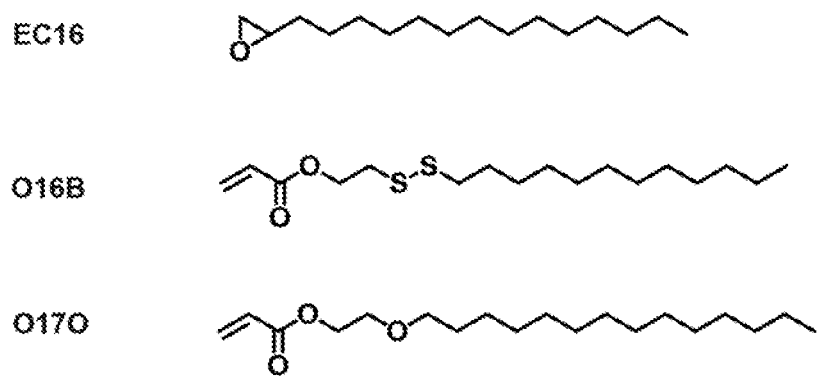
FIG. 5 depicts chemical structures of hydrophobic tails.
Figure 6:
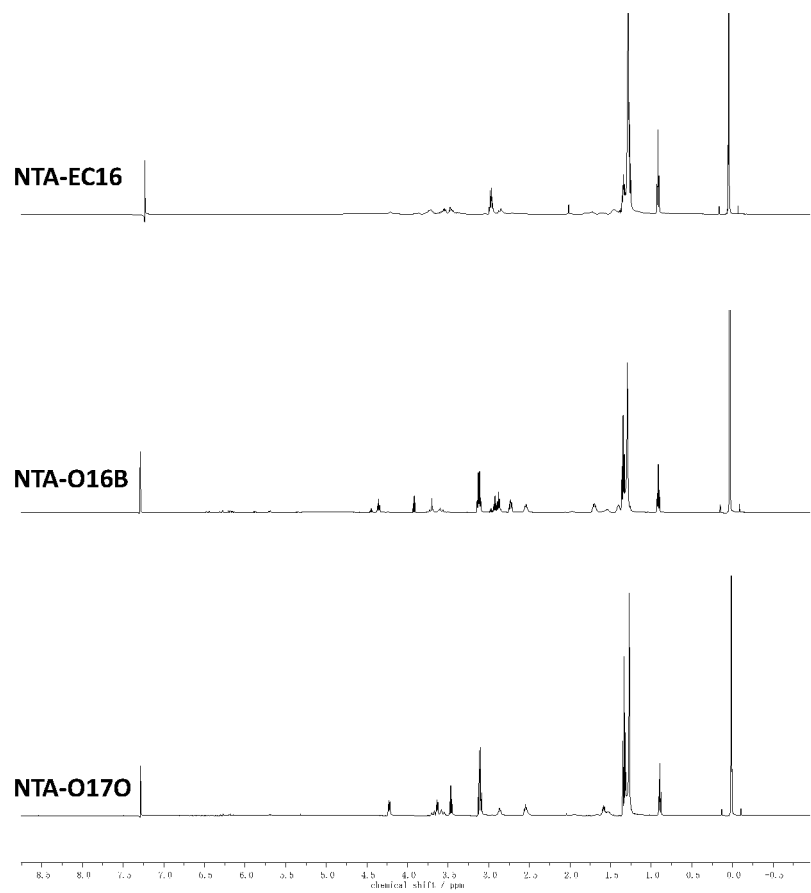
FIG. 6 depicts $^1$H NMR spectra of NTA-EC16, NTA-O16B and NTA-O170 in CDCl3.

Nitrilotriacetic acid group-containing amphiphilic lipidoids NTA-EC16, NTA-O16B and NTA-O17O (FIG. 1B) were synthesized by reacting Nα,Nα-bis(carboxymethyl)-L-lysine head group with hydrophobic tails (EC16,OO16B and O17O, FIG. 5); the products were purified using a Teledyne Isco Chromatography purification system. The structures of NTA-lipidoids were confirmed by ESI-MS and NMR analysis and the results are summarized in Table 1 and FIG. 6.

TABLE 1

Summary of ESI-MS results of NTA-lipidoids.

| Lipidoid | Chemical formula [M-H]$^-$ | Calculated [M-]$^-$ | Found [M-H]$^-$ |
|---|---|---|---|
| NTA-EC16 | C42H81N2O8 | 741.60 | 741.62 |
| NTA-O16B | C44H81N2O10S4 | 925.48 | 925.45 |
| NTA-O17O | C48H89N2O12 | 885.64 | 885.68 |

Figure 1B:
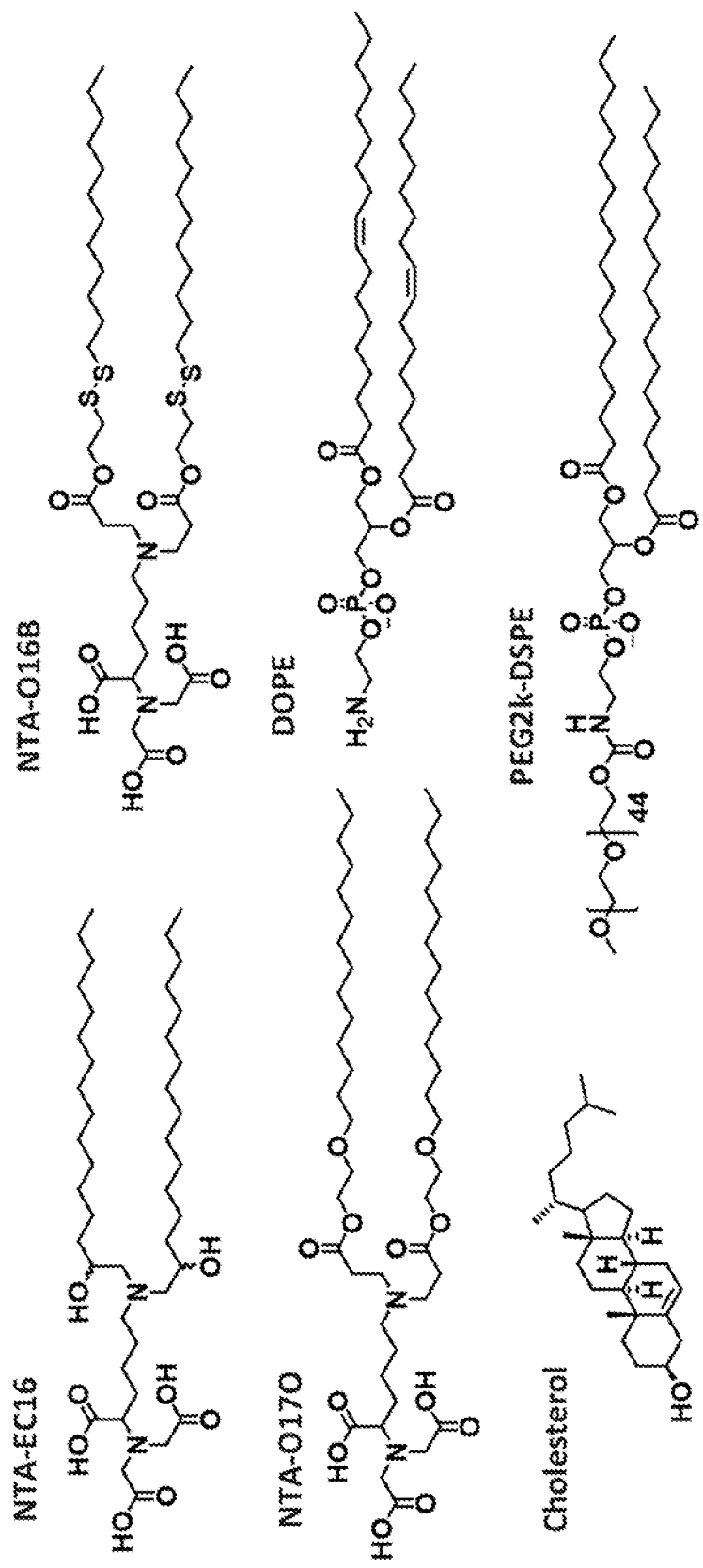
FIG. 1B depicts chemical structures of NTA-lipidoids and helper lipids used in this study.

The phospholipids like DOPE (1,2-dioleoyl-sn-glycero-3-phosphoethanolamine) and DSPC (1,2-distearoyl-sn-glycero-3-phosphocholine) could provide support to the lipids bilayer structures and facilitate the endosomal escape, which is essential for efficient bio-active molecules delivery. Cholesterol could further stabilize the nanoparticle structures and enhance cell internalization efficacy through promoting membrane fusion process; and PEGylated lipids like PEG2k-DSPE (1,2-distearoyl-sn-glycero-3-phosphoethanolamine-N-[methoxy(polyethylene glycol)-2000) and PEG-Ceramide, could reduce nanoparticles aggregation, non-specific adsorption, and enable longer circulation time once administrated systematically. In this study, lipidoid nanoparticles were fabricated together with nickel ions (Ni$^{2+}$/NTA group=1/1, molar ratio) and different amounts of helper lipids including cholesterol, DOPE and PEG2k-DSPE to optimize the intracellular delivery performance (FIG. 1A). The codes and components of lipidoid nanoparticle formulations tested in this study are summarized in Table 2. Briefly, nanoparticles in category A (coded as A1) consists of NTA lipidoids complexed with nickel ions (Ni-NTA lipidoids) without helper lipids (denoted as NTA-EC16-A1, etc.); category B nanoparticle formulations (coded as B1 and B2) have Ni-NTA lipidoids and cholesterol (denoted as NTA-EC16-B1, etc.); category C formulations (coded as C1, C2 and C3) have Ni-NTA lipidoids, cholesterol and DOPE (denoted as NTA-EC16-C1, etc.); category D formulations (coded as D1 and D2) have Ni-NTA lipidoids, cholesterol, DOPE and PEG2k-DSPE (denoted as NTA-EC16-D1, etc.).

TABLE 2

Codes and parameters of category A, B, C and D lipidoid nanoparticle formulations used in this study

| | Molar Composition/% | | | |
|---|---|---|---|---|
| Code | Ni-NTA lipidoid | Cholesterol | DOPE | PEG2k-DSPE |
| A1 | 100.0 | 0 | 0 | 0 |
| B1 | 89.3 | 10.7 | 0 | 0 |
| B2 | 67.6 | 32.4 | 0 | 0 |
| C1 | 73.0 | 8.8 | 18.2 | 0 |
| C2 | 57.8 | 27.8 | 14.4 | 0 |
| C3 | 50.5 | 24.3 | 25.2 | 0 |
| D1 | 64.1 | 30.8 | 4.0 | 1.1 |
| D2 | 55.7 | 26.7 | 13.9 | 3.7 |

Example 2. Intracellular Delivery of GFP Protein

Figure 7:
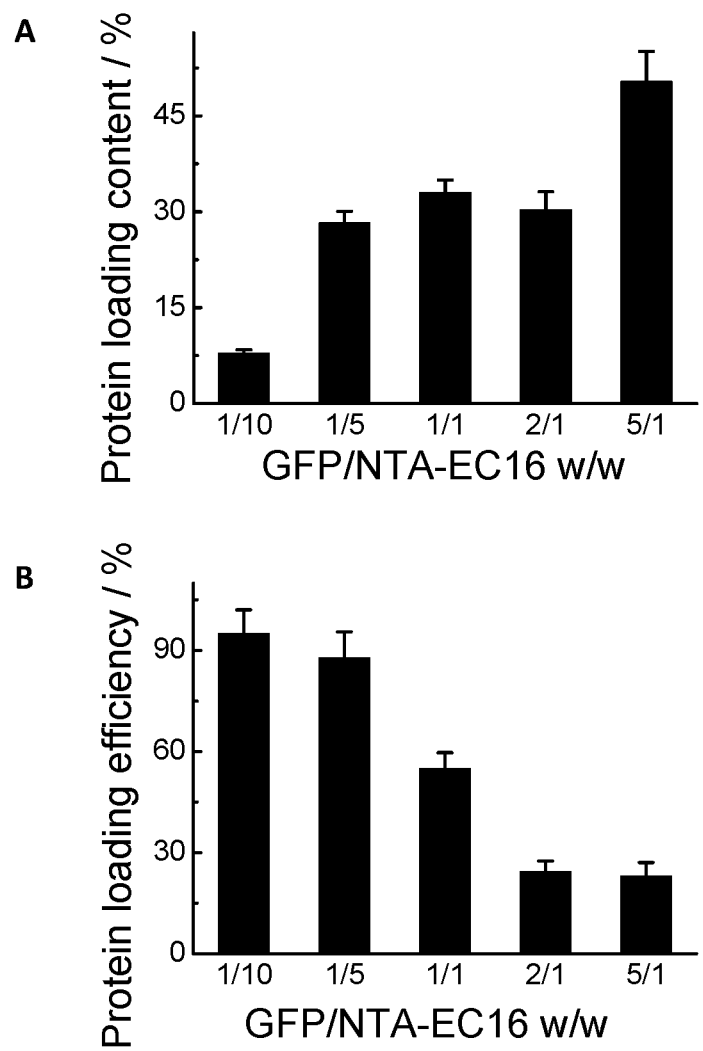
FIG. 7A depicts GFP loading content.
FIG. 7B depicts GFP loading efficiency determined for NTA-EC16-B2 formulations at different protein/NTA-lipidoid feeding ratios.
Figure 8:
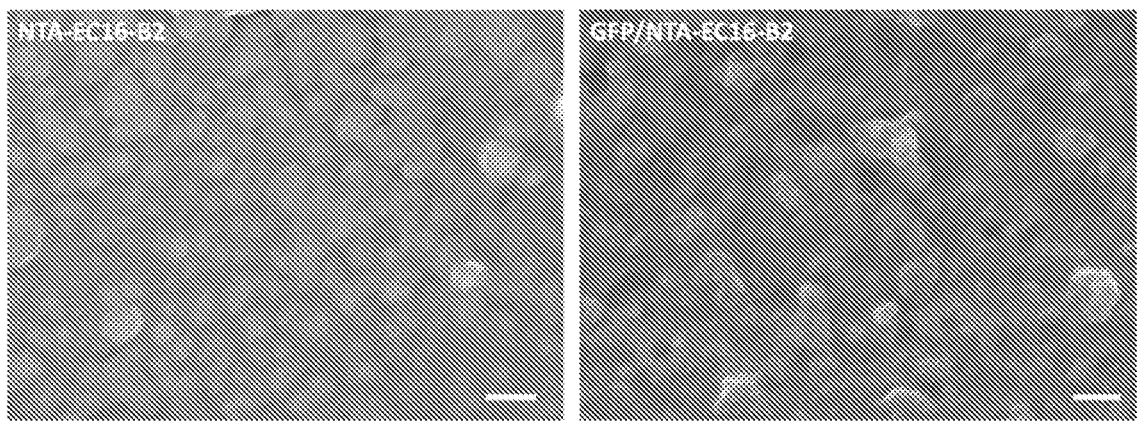
FIG. 8 depicts SEM images of blank and GFP loaded NTA-EC16-B2 nanoparticles.

For the intracellular delivery study, NTA-EC16 lipidoids were formulated with nickel ions and helper lipids into nanoparticles at first. Green fluorescent protein with a 6×His tag (His-tagged GFP; shortened as GFP in this study) was used as model cargo protein to measure the delivery efficacy of the lipidoid nanoparticles. GFP loaded lipidoid nanoparticles were first prepared by mixing the protein with nickel ions complexed lipidoid nanoparticles at room temperature (see Experimental Section). Using nanoparticle formulation NTA-EC16-B2, both the protein loading content ($W_{protein\ loaded\ in\ nanoparticle}/(W_{protein\ loaded\ in\ nanoparticle}+W_{nanoparticle})*100\%$) and protein loading efficiency ($W_{protein\ loaded\ in\ nanoparticle}/W_{total\ feeding\ protein}*100\%$) were determined. As shown in FIG. 7, in general, low protein/NTA-lipidoid feeding ratio resulted in low protein loading content and high loading efficiency; while high feeding ratio generated high loading content and relative low loading efficiency. For example, the GFP protein loading content and loading efficiency at protein/NTA-EC16 of 1/10 and 5/1 (weight ratios) were determined to be 7.9%/95.1% (protein loading content/protein loading efficiency) and 50.4%/23.0%, respectively. At the feeding ratio of GFP/NTA-EC16=1/1, the protein loading content and efficiency turned out to be 33.0% and 54.9% for the formulation of NTA-EC16-B2. SEM examination results (shown in FIG. 8) revealed that both the blank and GFP protein loaded NTA-EC16-B2 complexes (NTA-EC16-B2 and GFP/NTA-EC16-B2) are spherical nanoparticles with the sizes of 150-300 nm at dry state.

Figure 2:
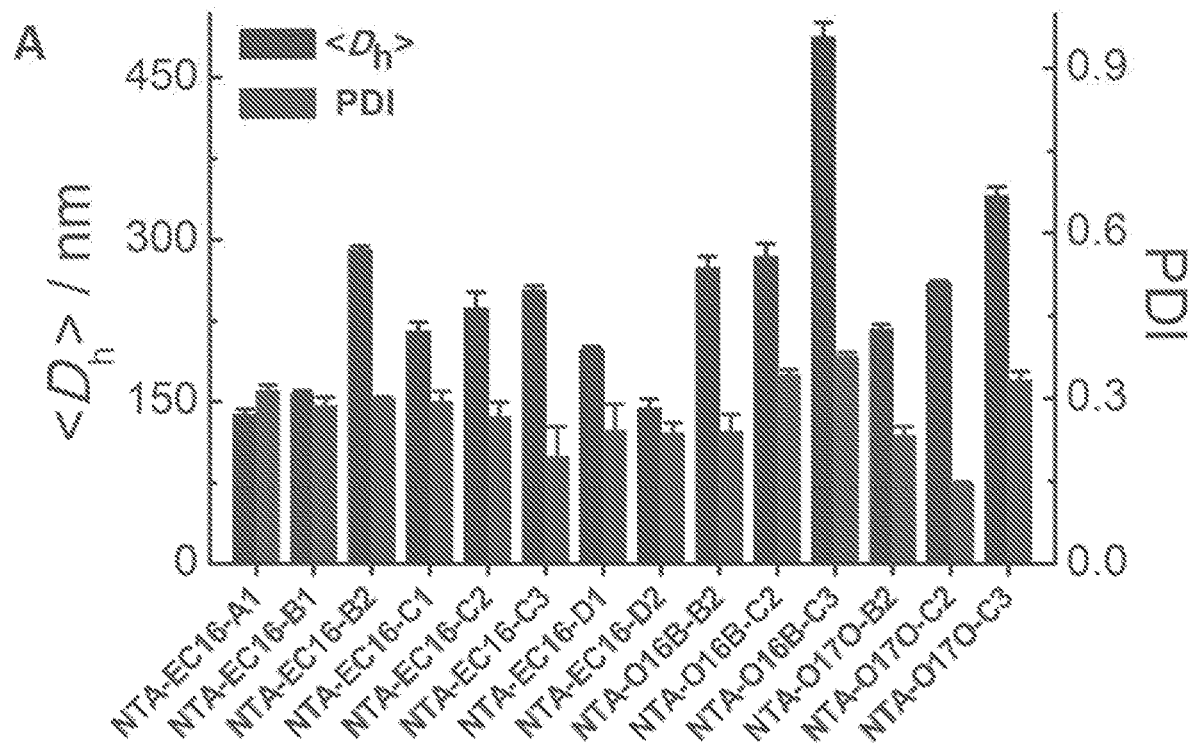
FIG. 2A depicts averaged hydrodynamic diameter (<$D_h$>) and polydispersity index (PDI) of GFP-loaded nanoparticles characterized by DLS.
FIG. 2B depicts size distribution of GFP-loaded nanoparticles characterized by DLS.
FIG. 2C depicts relative size change profiles of GFP-loaded nanoparticles.
FIG. 2D depicts delivery efficacy.
FIG. 2E depicts cytotoxicity of GFP-loaded nanoparticles tested against HeLa cell after 8 h exposure.
FIG. 2F depicts typical flow cytometry profiles (green fluorescence histograms) of control, GFP and GFP-loaded nanoparticles treated HeLa cells.
FIG. 2G depicts intracellular delivery efficiencies of GFP-loaded nanoparticle formulations with and without Ni-NTA lipidoids after 8 h of exposure.
FIG. 2H depicts HeLa cell uptake of GFP-loaded nanoparticles (NTA-EC16-B2, NTA-EC16-C2 and NTA-EC16-C3) was suppressed by endocytosis inhibitors (Dynasore, a dynamin II inhibitor; M-β-CD, plasma cholesterol-depleting agent; Sucrose, a clathrin-mediated endocytosis inhibitor).
Figure 2:
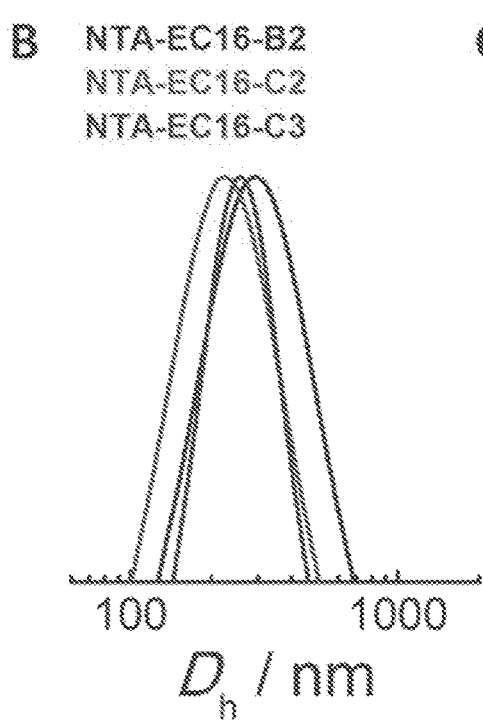
Figure 2:
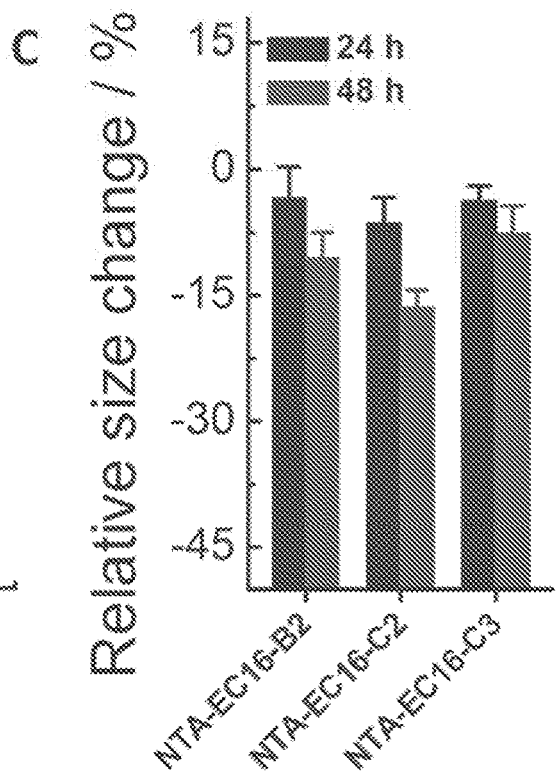
Figure 2:
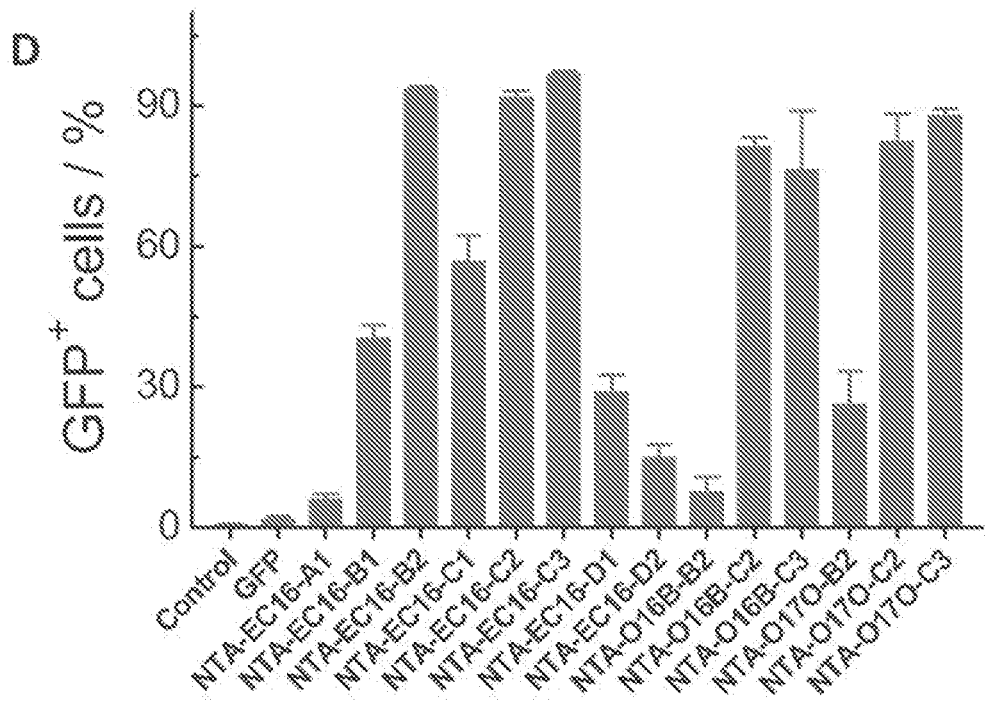
Figure 2:
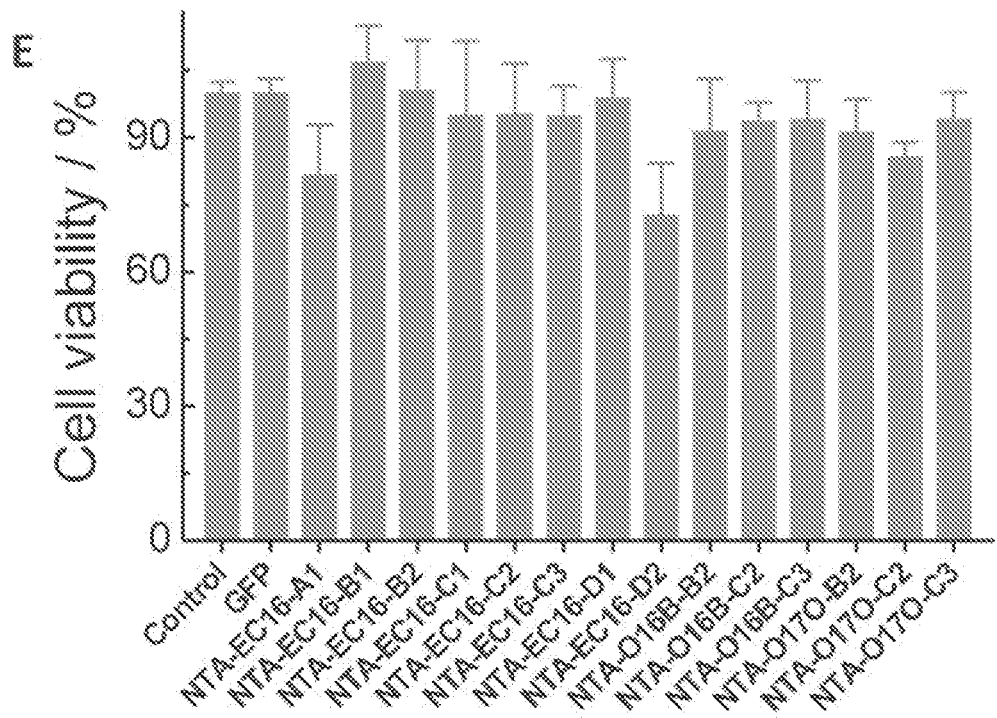
Figure 2:
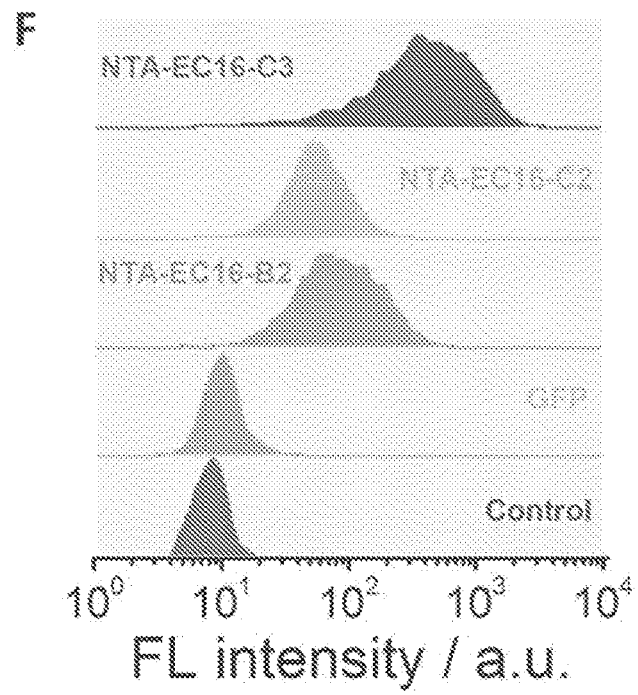
Figure 2:
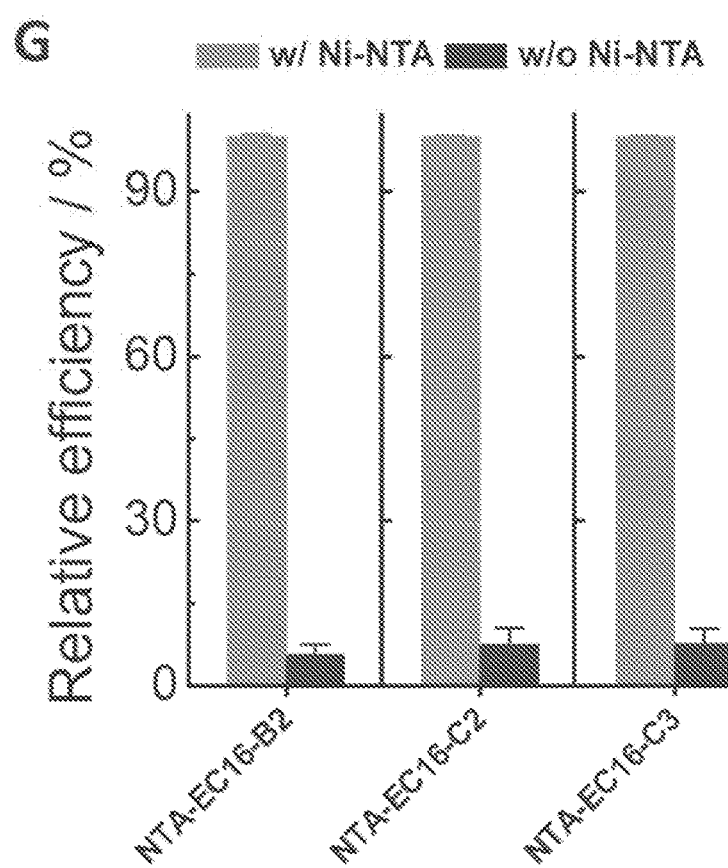
Figure 2:
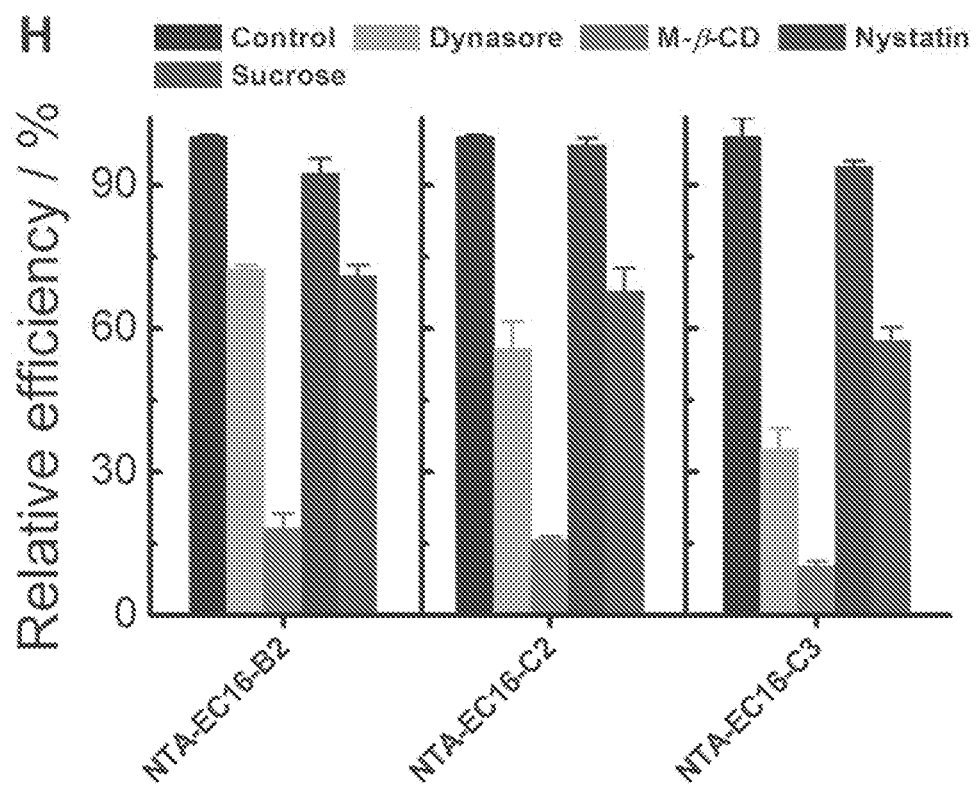
Figure 9:
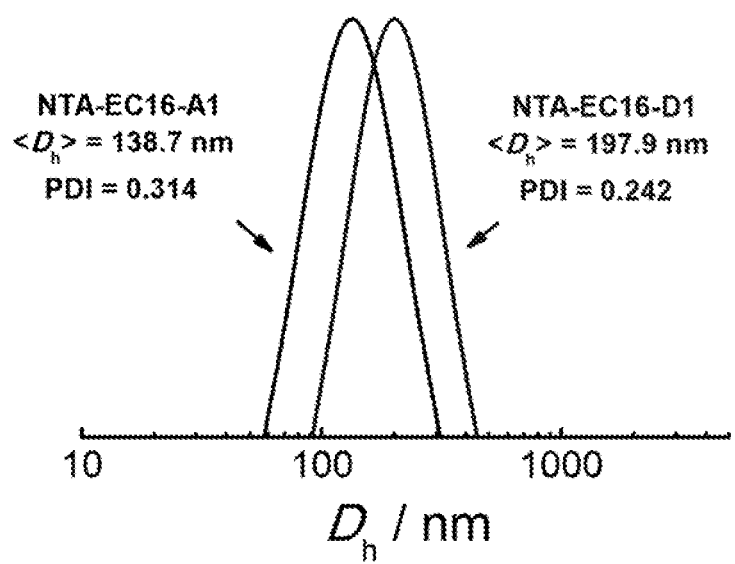
FIG. 9 depicts hydrodynamic diameter distributions of GFP-loaded NTA-EC16-A1 and NTA-EC16-D1 nanoparticles.

All the other categories of GFP protein loaded formulations were then fabricated using the feeding ratio of GFP/NTA-lipidoid as 1/1 (weight ratio). Their averaged hydrodynamic sizes ($<D_h>$) and polydispersity indexes (PDIs) were determined by dynamic light scattering (DLS) measurements. As shown in FIG. 2A, most (6 out of 8) of the GFP loaded nanoparticles' sizes are between 130-300 nm. GFP loaded NTA-EC16-A1 (138.7 nm) and NTA-EC16-D2 (144.3 nm) possessed the smallest sizes while, NTA-EC16-B2 (290.5 nm) was determined as the biggest. Furthermore, except for NTA-EC16-A1 (PDI=0.314), all other nanoparticles have PDIs smaller than 0.3, indicating the uniformity and relative homogeneity of particle sizes as well as the lack of evident aggregations. The typical hydrodynamic size distribution profiles of GFP loaded NTA-EC16-A1 ($<D_h>$=138.7 nm, PDI=0.314), NTA-EC16-B2 ($<D_h>$=290.5 nm, PDI=0.299), NTA-EC16-C2 ($<D_h>$=236.4 nm, PDI=0.267), NTA-EC16-C3 ($<D_h>$=253.2 nm, PDI=0.195) and NTA-EC16-D1 ($<D_h>$=197.9 nm, PDI=0.242) are shown in FIG. 2B and FIG. 9. The stability of GFP loaded nanoparticles (NTA-EC16-B2, NTA-EC16-C2 and NTA-EC16-C3) stored at room temperature was measured by DLS (FIG. 2C). After 24 h, all the three tested nanoparticles showed negligible size variations, less than ±7% of relative size change (−3.4% for NTA-EC16-B2, −6.4% for NTA-EC16-C2, and −3.7% for NTA-EC16-C3), compared to the sizes of freshly prepared samples which demonstrates that the nanoparticles are relatively stable under this condition. After 48 h, NTA-EC16-B2, NTA-EC16-C2 and NTA-EC16-C3 showed relative size change of −10.6%, −16.5% and −7.6%, respectively, which indicates the rearrangement process of the supramolecular structures of GFP protein loaded NTA-EC16-based lipidoids nanoparticles during storage under room temperature; meanwhile no evident aggregation was observed.

Figure 10:
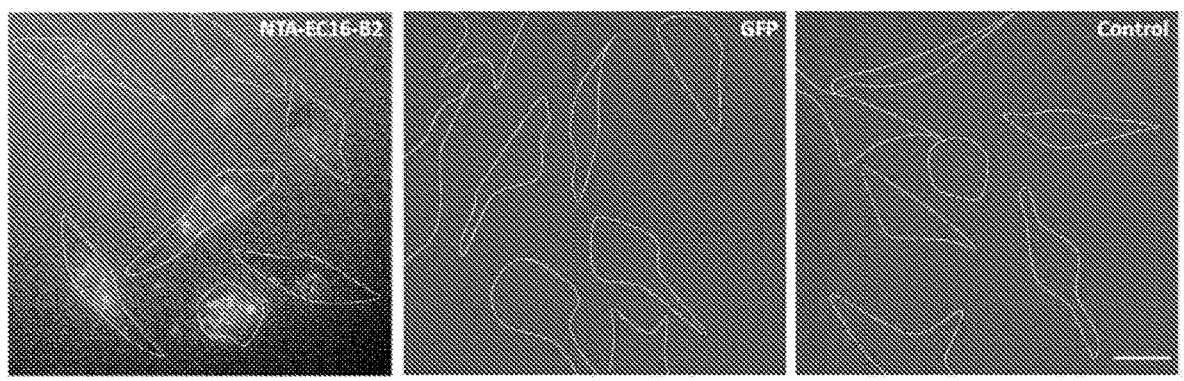
FIG. 10 depicts fluorescent images of (GFP loaded NTA-EC16-B2 nanoparticles and free GFP) treated (8 h exposure) and untreated HeLa cells, using a BZ-X Analyzer fluorescence microscope. Cells were outlined with dashed white lines for clarity. Scale bar=50 m.

Next, the GFP loaded nanoparticles were incubated with HeLa cells ([GFP]=230 nM, [NTA-lipidoid]=7.14 mg L$^{-1}$) and harvested after 8 h of exposure. The HeLa cells were then analyzed via flow cytometry to evaluate the internalization efficiencies of the nanoparticles as measured by GFP-positive (GFP$^+$) cell percentages. As shown in FIG. 2D, naked GFP cannot be internalized by the HeLa cells as ~1.8% of GFP$^+$ cells were determined for naked GFP treated cell, which is similar to the control group (0.6% of GFP$^+$ cells). In sharp contrast, NTA-EC16 lipidoid nanoparticles including NTA-EC16-B2, NTA-EC16-C2 and NTA-EC16-C3 are very efficient for delivering GFP protein into HeLa cells, as 93.7%, 91.9% and 96.9%, respectively, of cells were determined to be GFP$^+$. The typical flow cytometry profiles (histograms of green fluorescence intensity) of the HeLa cells treated by naked GFP and GFP loaded NTA-EC16-B2, NTA-EC16-C2 and NTA-EC16-C3 nanoparticles are shown in FIG. 2F. Meanwhile, NTA-EC16-C1, NTA-EC16-B1 and NTA-EC16-D1 also performed well, as 56.8%, 40.4% and 29.0% of the treated cells being identified as GFP$^+$, respectively. Considering that NTA-EC16-A1 induced ~6.2% of GFP$^+$ cells, it was established that the helper lipids play important roles in the cell transfection process, and the amount of helper lipids added are also essential for optimized performances. Typical fluorescent images of free GFP and GFP loaded NTA-EC16-B2 nanoparticles treated HeLa cells are shown in FIG. 10 (BZ-X Analyzer fluorescence microscope). Free protein without carriers cannot efficiently enter into the cells, which is consistent with the flow cytometry data as shown in FIG. 2D; while green fluorescence signals from GFP proteins were detected from the nanocomplexes (GFP/NTA-EC16-B2) treated cells and the cargoes seem to be distributed as bright dots over the cell after 8 h of exposure.

FIG. 2G shows that when the Ni-NTA lipidoids were removed from the formulations (NTA-EC16-B2, NTA-EC16-C2 and NTA-EC16-C3), the helper lipids (cholesterol and DOPE) cannot efficiently deliver His-tagged GFP protein ([GFP]=230 nM; exposure time=8 h) using the self-assembly and cargo loading procedures reported in this study, into HeLa cells, under the same incubation conditions. This result demonstrated the importance of Ni-NTA lipidoids-enabled protein binding capability in the intracellular delivery processes.

The cell internalization mechanism of nanoparticle formulations was then studied. As shown in FIG. 2H, to NTA-EC16-B2, NTA-EC16-C2 and NTA-EC16-C3 nanoparticles, the dynasore (dynamin II inhibitor), M-β-CD (plasma cholesterol-depleting agent) and sucrose (clathrin-mediated endocytosis inhibitor) treated HeLa cells showed decreased GFP transfection efficiencies. Lowest transfection efficiencies were observed from M-β-CD treated cells for all three tested nanoparticles (GFP loaded NTA-EC16-B2, NTA-EC16-C2 and NTA-EC16-C3 nanoparticles). On the other hand, nystatin (a caveolin-endocytosis inhibitor) did not suppress the internalization of GFP loaded nanoparticles efficiently comparing to other three tested inhibitors. These results indicate that clathrin, plasma cholesterol and dynamin play important roles in the cellular uptake of these GFP protein complexed NTA-EC16 lipidoid nanoparticle formulations. The plasma cholesterol and caveolin-mediated pathways possessed the most and the least significant effects on the internalization process of GFP protein loaded NTA-lipidoid nanoparticles.

Both of the delivery efficiency and toxicity of synthetic lipidoids were largely depending on their molecular structures, i.e. head groups, linker units and tails. We synthesized another two types of NTA-lipidoids with O16B and O17O tails to examine if integrating disulfide bond and chalcogen could achieve improved delivery performances. NTA-O16B and NTA-O17O lipidoids were characterized by MS and NMR, and the results are shown in Table 1 and FIG. 6.

In order to make the screening process more efficient, those formulations that have been demonstrated to be highly-active for NTA-EC16 lipidoid were tested, with the newly synthesized NTA lipidoids (NTA-O16B and NTA-O17O). Encouraged by the results of NTA-EC16 lipidoid nanoparticles as shown in FIG. 2D, NTA-O16B and NTA-O17O nanoparticles with B2, C2 and C3 formulations (Table 2) were then prepared for intracellular delivery of GFP protein. The NTA-O16B-B2 ($<D_h>$=273.7 nm, PDI=0.240), NTA-O16B-C2 ($<D_h>$=284.4 nm, PDI=0.343), NTA-O16B-C3 ($<D_h>$=487.7 nm, PDI=0.377), NTA-O17O-B2 ($<D_h>$=216.8 nm, PDI=0.233), NTA-O17O-C2 ($<D_h>$=259.7 nm, PDI=0.145) and NTA-O17O-C3 ($<D_h>$=340.9 nm, PDI=0.333) nanoparticles were characterized by DLS and results are shown in FIG. 2A. Then HeLa cells were treated with formulated NTA-O16B and NTA-O17O nanoparticles loaded with GFP protein and analyzed through flow cytometry. As shown in FIG. 2D, both NTA-O16B-B2 (7.6% of GFP⁺ cells) and NTA-O17O-B2 (26.4%) induced much less GFP⁺ cells comparing to NTA-EC16-B2 nanoparticles, while NTA-O16B-C2 (81.2% of GFP⁺ cells), NTA-O16B-C3 (76.4%), NTA-O17O-C2 (82.3%), and NTA-O17O-C3 (87.9%) can efficiently facilitate the internalization of GFP protein. These results reveal that the intracellular transfection efficiency of formulated lipidoid nanoparticles depends on both the species and amount of NTA-lipidoids (NTA-EC16, NTA-O176B and NTA-O17O) and helper lipids (cholesterol and DOPE) in the formulation.

Biocompatibility is also an important issue to consider when developing nanocarriers for bio-active molecules delivery. The cell viability profiles of GFP protein loaded NTA-lipidoid nanoparticles treated cells were measured by MTT assay. HeLa cells were treated with nanoparticles under the same conditions as used in the transfection study ([GFP]=230 nM; exposure time=8 h) and cell viability was calculated comparing to the control groups. As shown in FIG. 2E, naked GFP protein was non-toxic under the tested conditions as the cell viability was determined to be similar to the untreated control cells. In regards to the NTA-lipidoid nanoparticles treated cells, with the exception for NTA-EC16-D2 which showed a relatively lower cell viability of ~72.9%, all other groups have greater than 80% cell viabilities. The generally high percentage of cell viability indicates a good compatibility of GFP loaded NTA-lipidoid (NTA-EC16, NTA-O16B and NTA-O17O) nanoparticles against HeLa cells.

Example 3. Intracellular Delivery of (−30)GFP-Cre Recombinase

The possibility of using the newly developed nanoparticles to deliver functional proteins for genome editing purposes was further explored. In this context, supernegatively charged green fluorescent protein variant fused Cre recombinase with 6×His tag (denoted as (−30)GFP-Cre) was used as the cargo and DsRed-HeLa model cells as the target cells that expresses red fluorescent protein, DsRed, only upon Cre-mediated recombination.

Figure 3:
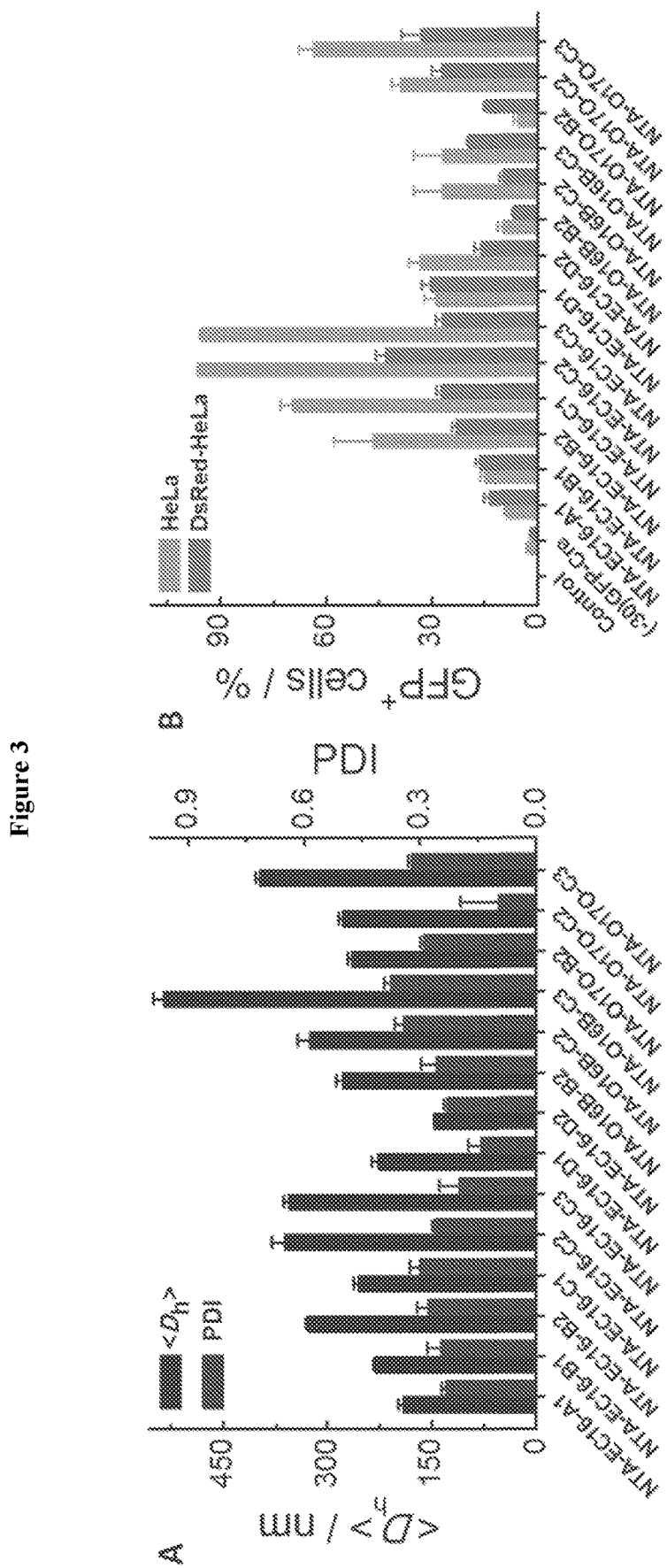
FIG. 3A depicts averaged hydrodynamic diameter and polydispersity index of (−30)GFP-Cre-loaded nanoparticles characterized by DLS.
FIG. 3B depicts delivery efficacy of (−30)GFP-Cre-loaded nanoparticles tested against HeLa and DsRed-HeLa cells after 8 h of exposure.
FIG. 3C depicts DsRed protein expression.
FIG. 3D depicts cell viability of (−30)GFP-Cre-loaded nanoparticles treated DsRed-HeLa cells after 24 h of exposure.
Figure 3:
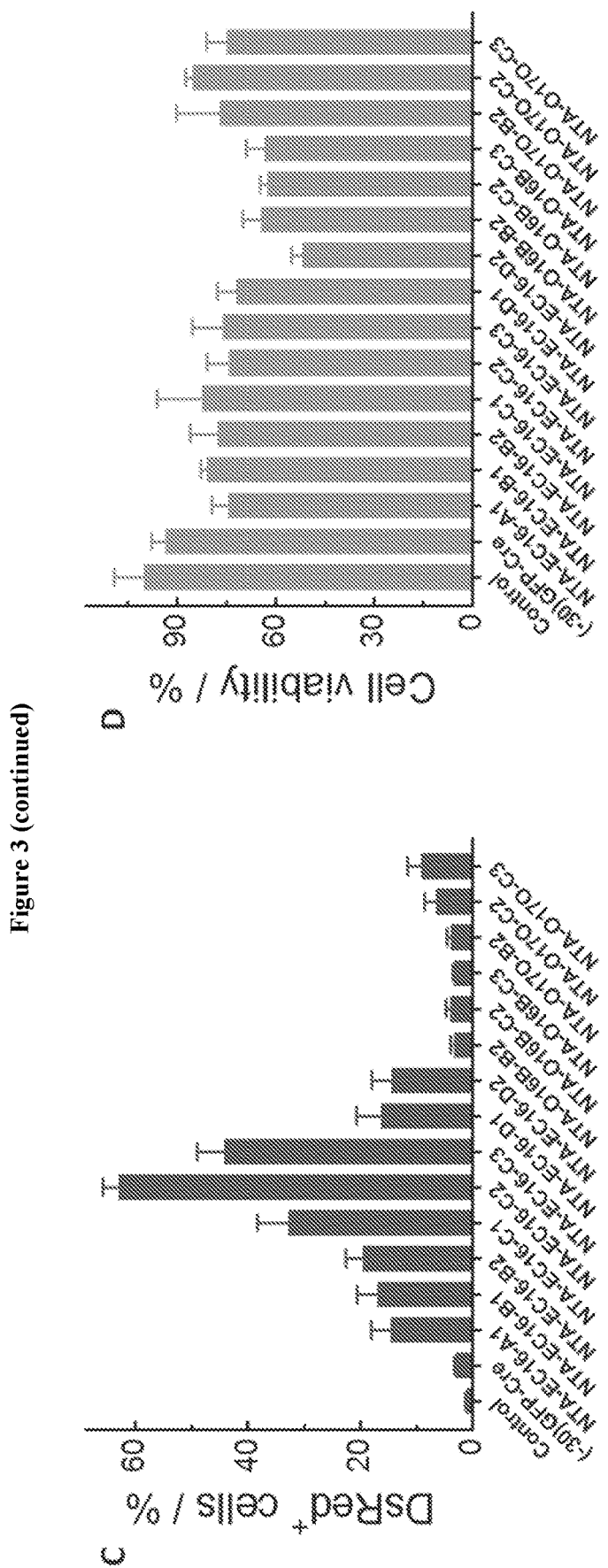
Figure 11:
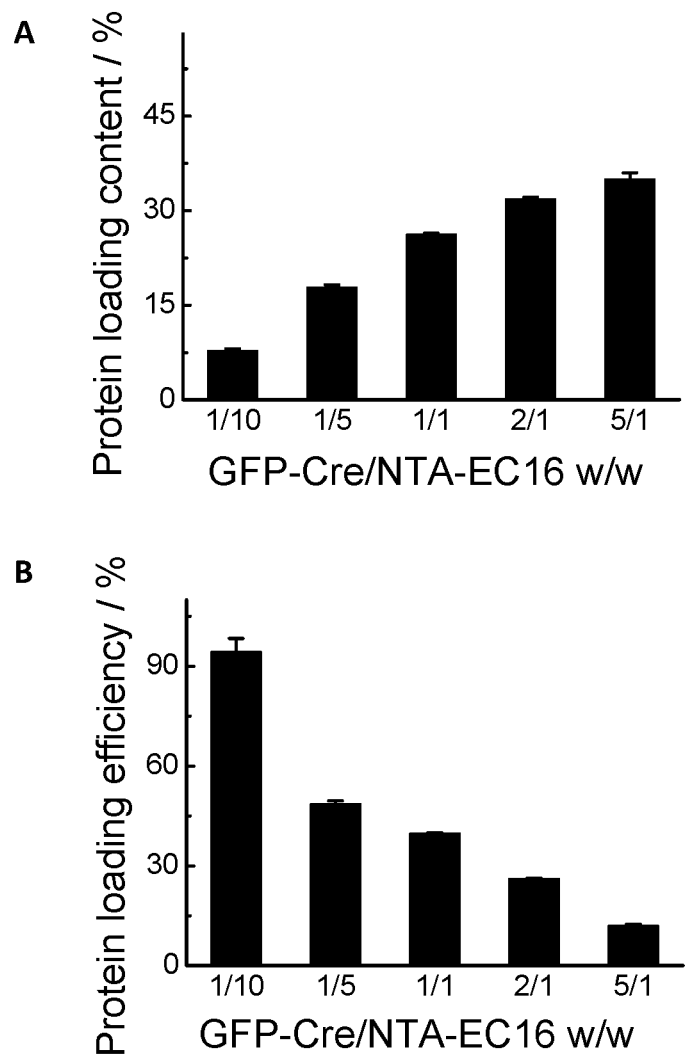
FIG. 11A depicts GFP-Cre loading content.
FIG. 11B depicts GFP-Cre loading efficiency determined for NTA-EC16-B2 formulations at different protein/NTA-lipidoid feeding ratios.

Similar to the GFP protein loading measurements (FIG. 7), as shown in FIG. 11, low (−30)GFP-Cre protein/NTA-lipidoid feeding ratio resulted in low protein loading content and high loading efficiency, while high feeding ratio generated high loading content and relative low loading efficiency. All the nanoparticle formulations were fabricated using 1/1 (w/w) feeding ratio of (−30)GFP-Cre protein/NTA-lipidoid. (−30)GFP-Cre protein loaded nanoparticles were then prepared and characterized by DLS measurements. As shown in FIG. 3A, most of the nanoparticles have larger sizes than their counterparts that loaded with GFP protein (FIG. 2A), and within the range of 150-350 nm. 10 out 14 nanoparticles showed PDI values lower than 0.3, which indicates the relative uniformity of these (−30)GFP-Cre loaded nanoparticles.

As illustrated before, NTA-lipidoid nanoparticles could be readily internalized by HeLa cells; nevertheless, the delivery efficiency of (−30)GFP-Cre protein loaded formulations were first tested against HeLa cells. After 8 h of exposure ([(−30)GFP-Cre]=109 nM, [NTA-lipidoid]=7.14 mg L⁻¹), HeLa cells were harvested and analyzed by flow cytometry. As shown in FIG. 3B, similar to GFP protein, the naked (−30)GFP-Cre protein cannot get into HeLa cells on its own. NTA-EC16-C2, NTA-EC16-C3 and NTA-EC16-C1 were identified to be most efficient for (−30)GFP-Cre protein delivery, as 96.3%, 95.5% and 69.8%, respectively, of the treated HeLa cells were GFP-positive; this result is similar to the results of GFP protein delivery shown in FIG. 2D. NTA-EC16-B2 also performed well, despite, the GFP⁺ cell percentage being determined to be lower than that of its GFP protein loaded counterparts where the phenomenon was also observed for (−30)GFP-Cre loaded NTA-O16B-C2, NTA-O16B-C3, NTA-O17O-C2 and NTA-O17O-C3 treated cells. It should be noted that lower protein molar concentrations were used in (−30)GFP-Cre delivery study ([(−30)GFP-Cre]=109 nM) comparing to the GFP protein delivery experiments ([GFP]=230 nM; FIG. 2D); the low protein concentration is due to consideration that the size of (−30)GFP-Cre recombinase is much larger than that of GFP protein. Nevertheless, these results illustrate that most of the NTA-lipidoid nanoparticles that are effective for GFP protein delivery are also capable of delivering (−30)GFP-Cre protein into HeLa cells, and that the physicochemical properties of the cargo proteins may also influence the intracellular delivery efficiencies.

Figure 12:
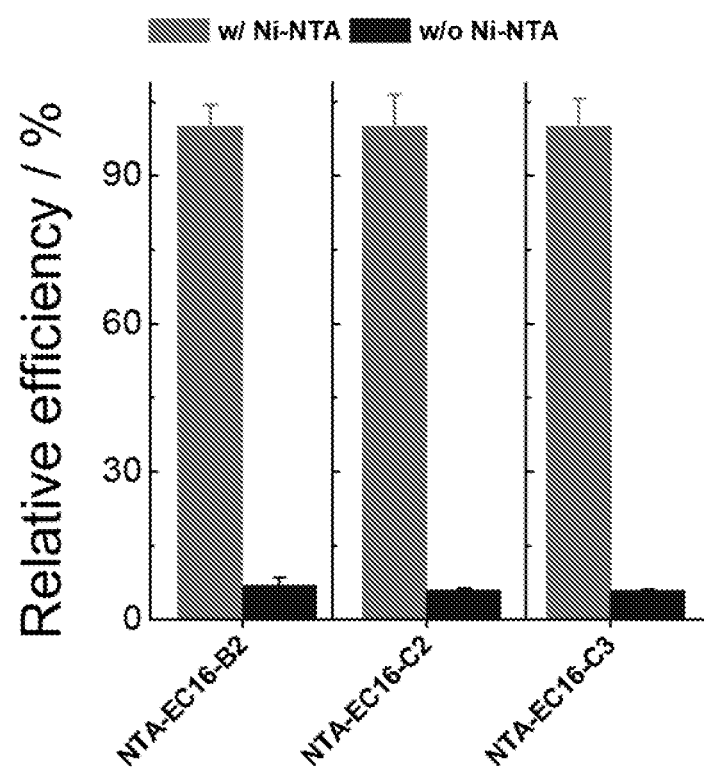
FIG. 12 depicts relative delivery efficiency of (−30)GFP-Cre protein loaded nanoparticle formulations with and without Ni-NTA lipidoids after 8 h of exposure against DsRed-HeLa cells.

Next, the (−30)GFP-Cre protein loaded NTA-lipidoid nanoparticles were tested against DsRed-HeLa cells. The cells were treated under the same conditions used for HeLa cells and the internalization efficacies were analyzed after 8 h of exposure ([(−30)GFP-Cre]=109 nM, [NTA-lipidoid]= 7.14 mg L⁻¹). As shown in FIG. 3B, naked (−30)GFP-Cre cannot be internalized by DsRed-HeLa cells. While both NTA-O16B-B2 and NTA-O16B-C2 induced less than 10% of GFP⁺ cells, all other nanoparticles treated samples showed around or greater than 15% of GFP⁺ cells. NTA-EC16-C2, NTA-O17O-C3 and NTA-EC16-D1 are proved to be most efficient for delivering (−30)GFP-Cre into DsRed-HeLa cells, with 43.2%, 33.0% and 30.5%, respectively, of the cells being identified as GFP⁺ after 8 h of exposure. It was determined that most of the active nanoparticles for transfecting HeLa cells are also efficient against DsRed-HeLa cells, however, the delivery efficacies are dependent on the cell models tested. Similar to the GFP delivery results shown in FIG. 2G, the nanoparticle formulations without Ni-NTA lipidoids cannot efficiently deliver (−30)GFP-Cre protein into DsRed-HeLa cells (FIG. 12), using the self-assembly and cargo loading procedures reported here.

Then, the gene recombination efficiency of (−30)GFP-Cre loaded nanoparticles treated DsRed-HeLa cells were evaluated after 24 h of exposure ([(−30)GFP-Cre]=109 nM, [NTA-lipidoid]=7.14 mg L⁻¹). The successful genetically edited cells are presented as DsRed-positive (DsRed⁺) cells in FIG. 3C. It was obvious that naked (−30)GFP-Cre protein induced negligible DsRed⁺ cells as a result of its poor internalization efficacy as revealed in FIG. 3B. On the other hand, NTA-EC16-C2, NTA-EC16-C3 and NTA-EC16-C1 are demonstrated to be most efficient for delivering (−30) GFP-Cre into DsRed-HeLa cells and inducing gene recombination, as 63.0%, 44.2% and 32.9%, respectively, of the cells were determined to be DsRed⁺. Moreover, other NTA-EC16 based lipidoid nanoparticles including NTA-EC16-A1 (14.7% of DsRed⁺ cells), NTA-EC16-B1 (17.0%), NTA-EC16-B2 (19.6%), NTA-EC16-D1 (16.3%) and NTA-EC16-D2 (14.6%) also performed well, while NTA-O16B and NTA-O17O originated formulations showed lower (less than 10%) genome editing efficiencies against DsRed-HeLa cells under the same tested conditions.

Finally, the cytotoxicity of (−30)GFP-Cre protein loaded lipidoid nanoparticles after 24 h of exposure was measured through the MTT assay. As shown in FIG. 3D, the cargo protein (i.e. (−30)GFP-Cre) was non-toxic under the tested conditions. Except for NTA-EC16-D2 and NTA-O16B originated nanoparticles which have the cell viability of 52-64%, all other formulation nanoparticles are well-tolerated by DsRed-HeLa cells for higher than 74% of cell viabilities were determined. Considering that higher concentrations of both active lipidoid ([NTA-lipidoid]=7.14 mg $L^1$) and cargo protein ([(−30)GFP-Cre]=109 nM) are tested here, the (−30)GFP-Cre protein loaded NTA-lipidoid nanoparticles are more compatible than previously reported cationic ones (Biomaterials 2018, 178, 652). Overall, comparing the above cytotoxicity test results (FIG. 3D) to that of the GFP loaded nanoparticles treated HeLa cells (FIG. 2E), as well as the internalization study (shown in FIG. 3B) fully demonstrates that the toxicity of the protein loaded nanoparticles are reliant on the physicochemical properties of both the composition of carriers and cargos, experimental conditions that have been tested (exposure time, concentration, etc.), and the cell model that is being tested against.

Example 4. Intracellular Delivery of CRISPR/Cas9 Ribonucleoprotein Complex

Figure 4:
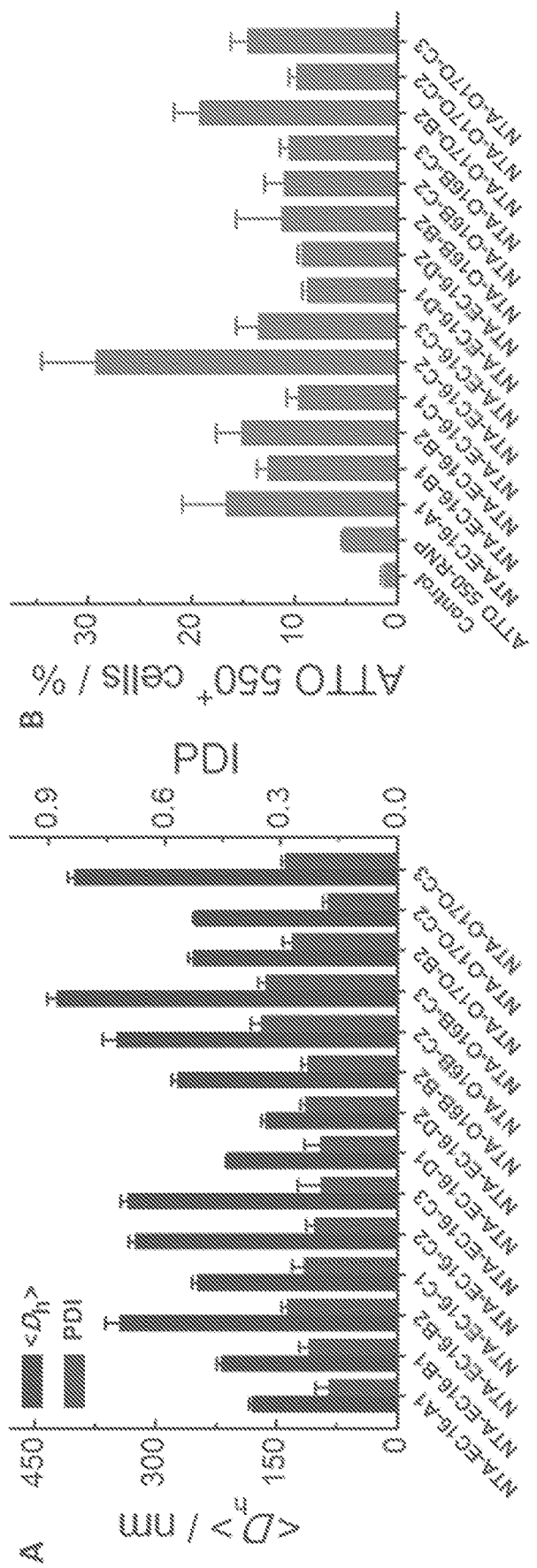
FIG. 4A depicts averaged hydrodynamic diameter and polydispersity index of Cas9:sgRNA-loaded nanoparticles characterized by DLS.
FIG. 4B depicts delivery efficacy of ATTO 550 labeled RNP complex (ATTO 550-RNP)-loaded nanoparticles tested against HEK cells after 8 h of exposure.
FIG. 4C depicts GFP knockout efficacy and FIG. 4D depicts cell viability of Cas9:sgRNA-loaded nanoparticles treated GFP-HEK cells after 48 h of exposure.
Figure 4:
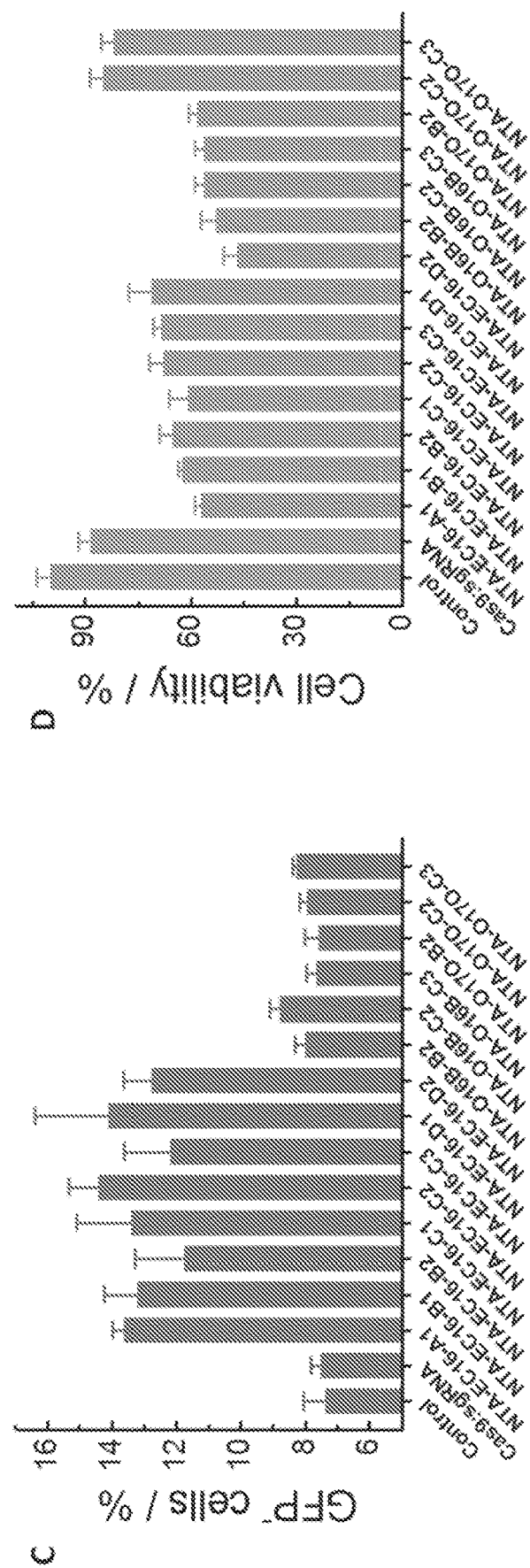

As the NTA-lipidoid nanoparticles were demonstrated to be efficient for facilitating the intracellular delivery of Cre recombinase and subsequent gene recombination, the nanoparticles were further challenged with the recently developed CRISPR/Cas9 genome-editing platform.[15] For this purpose, S. pyogenes Cas9 protein with nuclear localization sequence (NLS) and 6×His tags (denoted as Cas9) was synthesized and combined with guide RNA (gRNA) to form the RNP complexes (Cas9/gRNA=1/1, molar ratio). The hydrodynamic sizes and PDIs of Cas9 complexed single-guide RNA (Cas9:sgRNA) targeting GFP gene loaded NTA-lipidoid nanoparticles were characterized by DLS measurements. As shown in FIG. 4A, most of the nanoparticles (12 out of 14) have the sizes around 150-350 nm, which is comparable to the sizes of (−30)GFP-Cre loaded nanoparticles and are slightly larger than the sizes of GFP protein loaded ones. Similarly, as the PDI values of 12 out of 14 nanoparticles are lower than 0.3, these Cas9:sgRNA loaded nanoparticles are considered to be well-dispersed and suitable for intracellular delivery.

The GFP-expressing HEK cells (GFP-HEK) were used to evaluate the genome editing efficiency of Cas9:sgRNA (targeting GFP gene) loaded nanoparticles. At first, the internalization study was conducted using HEK cells and Cas9:gRNA RNP complexed with fluorescent dye ATTO 550 labeled two-components guide RNA system (ATTO 550-tracrRNA and crRNA), which is denoted as ATTO 550-RNP. The HEK cells were exposed to ATTO 550-RNP loaded NTA-lipidoid nanoparticles for 8 h ([ATTO 550-RNP]=88 nM, [NTA-lipidoid]=7.14 mg $L^{-1}$) and analyzed by flow cytometry. As shown in FIG. 4B, naked ATTO 550-RNP complex induced slightly higher ATTO 550-positive (ATTO 550+) cell portion compared to the control cells, which may be mainly a result of non-specific adsorption process. Enhanced cell internalization of ATTO 550-RNP was recorded in the presence of NTA-nanoparticles. NTA-EC16-C2 showed highest internalization efficacy as 29.3% of HEK cells were determined to be ATTO 550+. Meanwhile, NTA-EC16-A1, NTA-EC16-B2 and NTA-O17O-B2 also performed well as 15-20% of treated cell were found to be ATTO 550+. Around 10% of transfected cells were observed for the remaining nanoparticles in the NTA-lipidoid formulations. Then, Cas9 combined with sgRNA targeting GFP gene were complexed with the NTA-lipidoid nanoparticles and tested against GFP-HEK cells. In this case, the GFP-HEK cells were treated with Cas9:sgRNA loaded nanocomplexes for 48 h ([Cas9:sgRNA]=88 nM, [NTA-lipidoid]=7.14 mg $L^{-1}$), harvested and the GFP gene knockout efficacy (presented as GFP-negative or GFP$^-$ cell portions) was further analyzed using flow cytometry. As shown in FIG. 4C, naked Cas9:sgRNA RNP complex induced negligible GFP knockout as the percentage of GFP$^-$ cells were determined to be similar to the untreated control group. The results show that the relative weak ATTO 550 signals after 8 h of incubation as shown in FIG. 4B is either a result of non-specific adsorption or the partially internalized complexes that were trapped and/or digested in the end. In comparison, NTA-EC16 lipidoids based nanoparticles showed some level of GFP knockout as 11-15% of GFP$^-$ cells were recorded for these formulations. Nanoparticles that were previously demonstrated to be effective for GFP and (−30)GFP-Cre delivery, including NTA-EC16-B2, NTA-EC16-C1, NTA-EC16-C2 and NTA-EC16-C3 induced 11.8%, 13.4%, 14.4% and 12.2%, respectively, of GFP$^-$ cells. Similar to the (−30)GFP-Cre internalization and Cre-mediated recombination results shown in FIG. 3B and FIG. 3C, both NTA-O16B and NTA-O17O originated nanoparticle formulations induced very small amount to none GFP knockout. As shown in FIG. 3C and FIG. 4C, the NTA-EC16 based lipidoid nanoparticles performed better than its counterparts, NTA-O16B and NTA-O17O, with the same formulations, for genome editing proteins delivery. The tail structure of lipidoid molecule has huge impact on both of the transfection efficiency and toxicity profile of the lipidoid nanoparticles.

Finally, the cytotoxicity of CRISPR/Cas9 RNP loaded nanoparticles against GFP-HEK cells after 48 h of exposure was measured. As shown in FIG. 4D, most of the nanoparticles (12 out of 14) showed cell viabilities between 55-85%; the cell viability values indicate that the NTA-lipidoid nanoparticles possess acceptable biocompatibility as higher concentrations of both cargo proteins ([Cas9:sgRNA]=88 nM) and lipidoids ([NTA-lipidoid]=7.14 mg $L^1$) were used in this study comparing to previously reported cationic lipidoids-based delivery systems (Biomaterials 2018, 178, 652; Biomaterials science 2018, 10.1039/C8BM00637G). NTA-EC16-D2 showed the lowest cell viability after 48 h of incubation, which is also true in the cases of both GFP (FIG. 2E) and (−30)GFP-Cre (FIG. 3D) proteins delivery study after 8 h and 24 h, respectively. NTA-O17O-C2 and NTA-O17O-C3 are well-tolerated by GFP-HEK cells with cell viabilities comparable to cell viability of naked Cas9:sgRNA RNP complex. As most of the NTA-EC16 based nanoparticles (7 out of 8) have higher cell viabilities than the NTA-O16B series, and taking their gene knockout efficacies into account, the NTA-EC16 nanoparticles are more favorable for intracellular delivery of CRISPR/Cas9 RNP complexes.

REFERENCES CITED

[1] B. Leader, Q. J. Baca, D. E. Golan, Nature Reviews: Drug Discovery 2008, 7, 21.
[2] a) M. S. Kinch, Drug Discov Today 2015, 20, 393; b) S. S. Usmani, G. Bedi, J. S. Samuel, S. Singh, S. Kalra, P. Kumar, A. A. Ahuja, M. Sharma, A. Gautam, G. P. S. Raghava, Plos One 2017, 12, e0181748.
[3] a) A. L. Fu, R. Tang, J. Hardie, M. E. Farkas, V. M. Rotello, Bioconjugate Chem 2014, 25, 1602; b) Z. Gu, A. Biswas, M. X. Zhao, Y. Tang, Chem Soc Rev 2011, 40, 3638; c) M. Y. Yu, J. Wu, J. J. Shi, 0. C. Farokhzad, *J Control Release* 2016, 240, 24.

[4] a) M. Hansen-Bruhn, B. E. F. de Avila, M. Beltran-Gastelum, J. Zhao, D. E. Ramirez-Herrera, P. Angsantikul, K. V. Gothelf, L. F. Zhang, J. Wang, *Angew Chem Int Edit* 2018, 57, 2657; b) S. Kim, D. Kim, S. W. Cho, J. Kim, J. S. Kim, *Genome Res* 2014, 24, 1012; c) L. C. Tang, Y. T. Zeng, H. Z. Du, M. M. Gong, J. Peng, B. X. Zhang, M. Lei, F. Zhao, W. H. Wang, X. W. Li, J. Q. Liu, *Mol Genet Genomics* 2017, 292, 525.

[5] a) B. T. Staahl, M. Benekareddy, C. Coulon-Bainier, A. A. Banfal, S. N. Floor, J. K. Sabo, C. Urnes, G. A. Munares, A. Ghosh, J. A. Doudna, *Nat Biotechnol* 2017, 35, 431; b) W. J. Sun, W. Y. Ji, J. M. Hall, Q. Y. Hu, C. Wang, C. L. Beisel, Z. Gu, *Angew Chem Int Edit* 2015, 54, 12029; c) Z. Glass, Y. M. Li, Q. B. Xu, *Nat Biomed Eng* 2017, 1, 854; d) Y. M. Li, Z. Glass, Q. B. Xu, *Nat Biomed Eng* 2018, 2, 469.

[6] a) X. Gao, Y. Tao, V. Lamas, M. Q. Huang, W. H. Yeh, B. F. Pan, Y. J. Hu, J. H. Hu, D. B. Thompson, Y. L. Shu, Y. M. Li, H. Y. Wang, S. M. Yang, Q. B. Xu, D. B. Polley, M. C. Liberman, W. J. Kong, J. R. Holt, Z. Y. Chen, D. R. Liu, *Nature* 2018, 553, 217; b) J. A. Zuris, D. B. Thompson, Y. Shu, J. P. Guilinger, J. L. Bessen, J. H. Hu, M. L. Maeder, J. K. Joung, Z. Y. Chen, D. R. Liu, *Nat Biotechnol* 2015, 33, 73; c) M. Wang, J. A. Zuris, F. T. Meng, H. Rees, S. Sun, P. Deng, Y. Han, X. Gao, D. Pouli, Q. Wu, I Georgakoudi, D. R. Liu, Q. B. Xu, *P Natl Acad Sci USA* 2016, 113, 2868.

[7] R. Mout, M. Ray, G. Y. Tonga, Y. W. Lee, T. Tay, K. Sasaki, V. M. Rotello, *Acs Nano* 2017, 11, 2452.

[8] a) Y. Li, T. Yang, Y. Yu, N. Shi, L. Yang, Z. Glass, J. Bolinger, I. J. Finkel, W. Li, Q. Xu, *Biomaterials* 2018, 178, 652; b) Y. Li, J. Bolinger, Y. Yu, Z. Glass, N. Shi, L. Yang, M. Wang, Q. Xu, *Biomaterials science* 2018, 10.1039/C8BM00637G; c) M. Wang, K. Alberti, S. Sun, C. L. Arellano, Q. B. Xu, *Angew Chem Int Edit* 2014, 53, 2893; d) M. Wang, K. Alberti, A. Varone, D. Pouli, I. Georgakoudi, Q. B. Xu, *Adv Healthc Mater* 2014, 3, 1398; e) X. Y. Wang, Y. M. Li, Q. S. Li, C. I Neufeld, D. Pouli, S. Sun, L. Yang, P. Deng, M. Wang, I Georgakoudi, S. Q. Tang, Q. B. Xu, *J Control Release* 2017, 263, 39.

[9] M. Wang, S. Sun, C. I. Neufeld, B. Perez-Ramirez, Q. B. Xu, *Angew Chem Int Edit* 2014, 53, 13444.

[10] a) Y. Z. Dong, A. A. Eltoukhy, C. A. Alabi, O. F. Khan, O. Veiseh, J. R. Dorkin, S. Sirirungruang, H. Yin, B. C. Tang, J. M. Pelet, D. L. Chen, Z. Gu, Y. Xue, R. Langer, D. G. Anderson, *Adv Healthc Mater* 2014, 3, 1392; b) K. P. Mahon, K. T. Love, K. A. Whitehead, J. Qin, A. Akinc, E. Leshchiner, I. Leshchiner, R. Langer, D. G. Anderson, *Bioconjugate Chem* 2010, 21, 1448; c) K. A. Whitehead, J. R. Dorkin, A. J. Vegas, P. H. Chang, O. Veiseh, J. Matthews, O. S. Fenton, Y. L. Zhang, K. T. Olejnik, V. Yesilyurt, D. L. Chen, S. Barros, B. Klebanov, T. Novobrantseva, R. Langer, D. G. Anderson, *Nat Commun* 2014, 5, 4277; d) B. Li, X. Luo, B. B. Deng, J. B. Giancola, D. W. McComb, T. D. Schmittgen, Y. Z. Dong, *Sci Rep-Uk* 2016, 6, 22137.

[11] R. K. June, K. Gogoi, A. Eguchi, X. S. Cui, S. F. Dowdy, *J Am Chem Soc* 2010, 132, 10680.

[12] V. Postupalenko, D. Desplancq, I. Orlov, Y. Arntz, D. Spehner, Y. Mely, B. P. Klaholz, P. Schultz, E. Weiss, G. Zuber, *Angew Chem Int Edit* 2015, 54, 10583.

[13] K. J. Kauffman, J. R. Dorkin, J. H. Yang, M. W. Heartlein, F. DeRosa, F. F. Mir, O. S. Fenton, D. G. Anderson, *Nano Lett* 2015, 15, 7300.

[14] a) Y. Wang, A. G. Cheetham, G. Angacian, H. Su, L. S. Xie, H. G. Cui, *Adv Drug Deliver Rev* 2017, 110, 112; b) X. W. Li, S. Y. Tzeng, X. Y. Liu, M. Tammia, Y. H. Cheng, A. Rolfe, D. Sun, N. Zhang, J. J. Green, X. J. Wen, H. Q. Mao, *Biomaterials* 2016, 84, 157; c) S. Shen, J. X. Xia, J. Wang, *Biomaterials* 2016, 74, 1; d) X. W. Du, J. Zhou, J. F. Shi, B. Xu, *Chem Rev* 2015, 115, 13165; e) Z. Y. Song, Z. Y. Han, S. X. Lv, C. Y. Chen, L. Chen, L. C. Yin, J. J. Cheng, *Chem Soc Rev* 2017, 46, 6570.

[15] a) H. X. Wang, M. Li, C. M. Lee, S. Chakraborty, H. W. Kim, G. Bao, K. W. Leong, *Chem Rev* 2017, 117, 9874; b) Z. Glass, M. Lee, Y. M. Li, Q. B. Xu, *Trends Biotechnol* 2018, 36, 173; c) M. Wang, Z. A. Glass, Q. Xu, *Gene Ther* 2017, 24, 144.

[16] S. K. Alsaiari, S. Patil, M. Alyami, K. O. Alamoudi, F. A. Aleisa, J. S. Merzaban, M. Li, N. M. Khashab, *J Am Chem Soc* 2018, 140, 143.

[17] C. T. Charlesworth, P. S. Deshpande, D. P. Dever, B. Dejene, N. Gomez-Ospina, S. Mantri, M. Pavel-Dinu, J. Camarena, K. I. Weinberg, M. H. Porteus, *bioRxiv* 2018, https://doi.org/10.1101/243345.

[18] E. Haapaniemi, S. Botla, J. Persson, B. Schmierer, J. Taipale, *Nature medicine* 2018, 24, 927.

INCORPORATION BY REFERENCE

All U.S. and PCT patent publications and U.S. patents mentioned herein are hereby incorporated by reference in their entirety as if each individual patent publication or patent was specifically and individually indicated to be incorporated by reference. In case of conflict, the present application, including any definitions herein, will control.

OTHER EMBODIMENTS

Those skilled in the art will recognize or be able to ascertain using no more than routine experimentation many equivalents to the specific embodiments described herein.

The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

We claim:

1. A compound of formula (I):

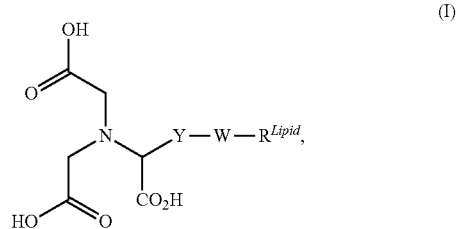

or a pharmaceutically acceptable salt thereof, wherein
Y is a divalent linker;
W is $-NR^{20}-$;
$R^{Lipid}$ is independently substituted or unsubstituted $C_{1-20}$ alkyl, substituted or unsubstituted $C_{2-20}$ alkenyl, substituted or unsubstituted $C_2$-20 alknyl, substituted or unsubstituted $C_{1-20}$ heteroalkyl, substituted or unsubstituted $C_{2-20}$ heteroalkenyl, or substituted or unsubstituted $C_{2-20}$ heteroalknyl; and
$R^{20}$ is $R^{Lipid}$.

2. The compound of claim 1, wherein $R^{Lipid}$ is of the structure:

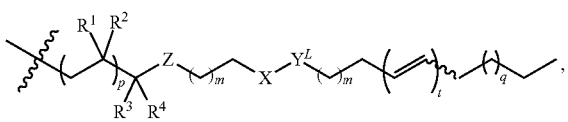

wherein
$R^1$ and $R^2$ are independently —H, —OH, —NHR$^{30}$, or —SH;
$R^3$ and $R^4$ are both —H; or $R^3$ and $R^4$ are taken together to form an oxo (=O) group;
Z is —CH$_2$—, —O—, —NR$^{30}$—, or —S—;
X and $Y^L$ are independently —CH$_2$—, —NR$^{30}$—, —O—, —S—, or —Se—;
m is an integer selected from 1-3;
n is an integer selected from 1-14;
p is 0 or 1;
q is an integer selected from 1-10;
t is 0 or 1; and
$R^{30}$ is —H, $C_{1-6}$ alkyl, $C_{2-6}$ alkenyl, or $C_{2-6}$ alkynyl.

3. The compound of claim 2, wherein;
(a] $R^1$ and $R^2$ are each independently —H or —OH; or
(b) $R^1$ and $R^2$ are —H; or
(c) $R^1$ is —H; and $R^2$ is —OH.

4. The compound of claim 2, wherein $R^3$ and $R^4$ are —H.

5. The compound of claim 2, wherein $R^3$ and $R^4$ are taken together to form an oxo (=O) group.

6. The compound of claim 1, wherein Y is substituted or unsubstituted $C_{1-6}$ alkylene, substituted or unsubstituted $C_{2-6}$ alkenylene, or substituted or unsubstituted $C_{2-6}$ alknylene, substituted or unsubstituted $C_{1-6}$ heteroalkylene, substituted or unsubstituted $C_{2-6}$ heteroalkenylene, or substituted or unsubstituted $C_{2-6}$ heteroalknylene.

7. The compound of claim 1, wherein Y is substituted or unsubstituted $C_{1-6}$ alkylene.

8. The compound of claim 1, wherein Y is

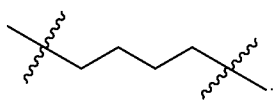 [SMILES: *CCCC*]

9. The compound of claim 2, wherein Z is —CH$_2$—, —O—, or —NR$^{30}$—.

10. The compound of claim 2, wherein:
(a) X and $Y^L$ are independently —CH$_2$— or —O—;
(b) X and $Y^L$ are independently —CH$_2$— or —O—, wherein X and $Y^L$ are not the same;
(c) X and $Y^L$ are independently —CH$_2$— or —S—;
(d) X and $Y^L$ are both —CH$_2$—; or
(e) X and $Y^L$ are both —S—.

11. The compound of claim 2, wherein m is 1 or 2.

12. The compound of claim 1, wherein each instance of $R^{Lipid}$ is independently selected from the group consisting of

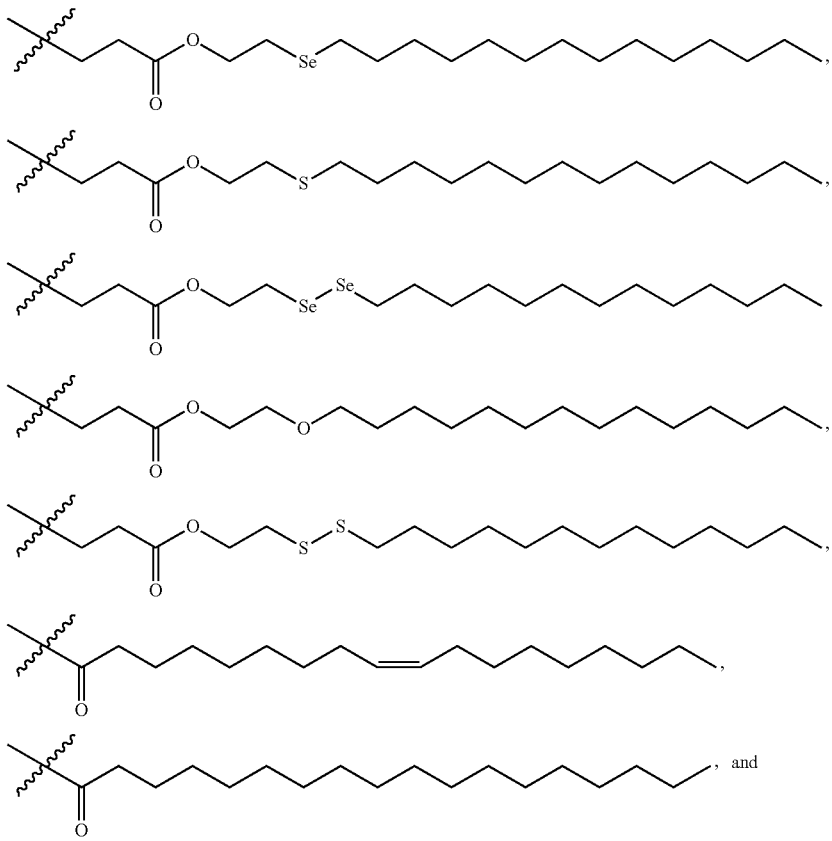

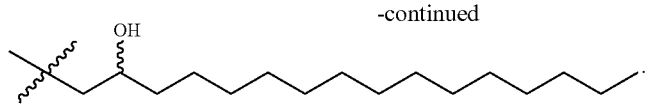

13. A compound selected from the group consisting of:

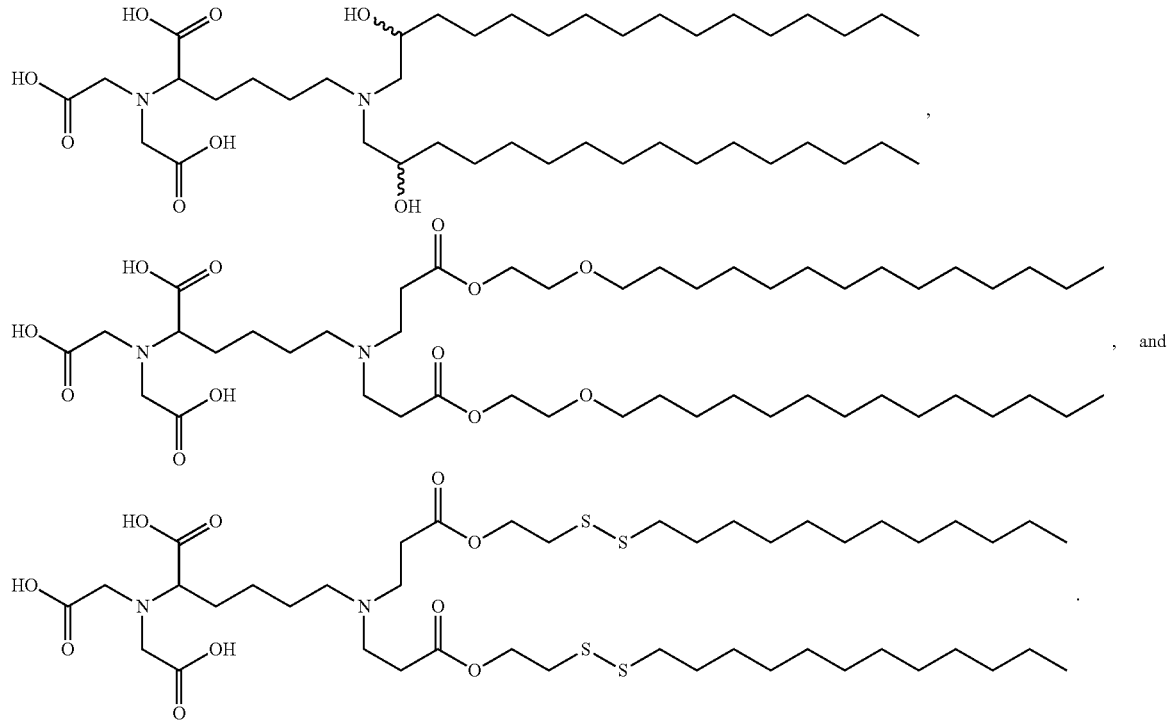

14. A lipidoid nanoparticle, comprising a compound of claim 1.

15. The lipidoid nanoparticle of claim 14, wherein the lipidoid nanoparticle further comprises:
(a) a cholesterol;
(b) DOPE or PEG2K-DEPC;
(c) a divalent nickel, wherein the compound chelates with the divalent nickel;
(d) a protein or a nucleic acid; or
(e) a small molecule.

16. The lipidoid nanoparticle of claim 15, wherein the lipidoid nanoparticle further comprises a protein or a nucleic acid, wherein the protein or the nucleic acid is GFP-Cre or CRISPR/Cas9.

17. The lipidoid nanoparticle of claim 15, wherein the lipidoid nanoparticle further comprises a divalent nickel, and the divalent nickel binds to the protein or the nucleic acid via a non-covalent interaction.

18. The lipidoid nanoparticle of claim 15, wherein the lipidoid nanoparticle further comprises a small molecule, and the small molecule is an antifungal agent or a chemotherapeutic agent.

19. The lipidoid nanoparticle of claim 14, wherein the lipidoid nanoparticle has a particle size of about 25 nm to about 1000 nm.

20. A pharmaceutical composition, comprising a lipidoid nanoparticle of claim 14, and a pharmaceutically acceptable carrier or excipient.

* * * * *